United States Patent
Bowman et al.

(10) Patent No.: US 9,758,597 B2
(45) Date of Patent: **\*Sep. 12, 2017**

(54) REDUCING POLYMERIZATION-INDUCED SHRINKAGE STRESS BY REVERSIBLE ADDITION-FRAGMENTATION CHAIN TRANSFER

(75) Inventors: Christopher Bowman, Boulder, CO (US); Diana Leung, Tuscaloosa, AL (US)

(73) Assignee: The Regents of the University of Colorado, a Body Corporate, Denver, CO (US)

( * ) Notice: Subject to any disclaimer, the term of this patent is extended or adjusted under 35 U.S.C. 154(b) by 410 days.

This patent is subject to a terminal disclaimer.

(21) Appl. No.: 13/567,706

(22) Filed: Aug. 6, 2012

(65) Prior Publication Data

US 2013/0096219 A1    Apr. 18, 2013

Related U.S. Application Data

(60) Provisional application No. 61/515,426, filed on Aug. 5, 2011.

(51) Int. Cl.
*C08F 2/00* (2006.01)
*C08F 2/38* (2006.01)
(Continued)

(52) U.S. Cl.
CPC .............. *C08F 2/00* (2013.01); *C08F 2/38* (2013.01); *C08F 2/48* (2013.01);
(Continued)

(58) Field of Classification Search
CPC ...... C08F 2/00; C08F 2/30; C08F 2/48; C08F 2/52; C08F 2222/1013; C08F 2222/102; C08F 2438/03
See application file for complete search history.

(56) References Cited

U.S. PATENT DOCUMENTS

| 4,097,994 A | 7/1978 | Reaville et al. |
| 4,622,302 A | 11/1986 | Sowers |

(Continued)

FOREIGN PATENT DOCUMENTS

| CA | 2 394 029 | 6/2001 |
| EP | 0 592 283 | 4/1994 |

(Continued)

OTHER PUBLICATIONS

Lai et al. Functional Polymers from Novel Carboxyl-Terminated Trithiocarbonates as Highly Efficient RAFT Agents. Marcomolecules, 2002, 35, 6754-6756.*

(Continued)

*Primary Examiner* — Sanza McClendon
(74) *Attorney, Agent, or Firm* — Lathrop Gage LLP

(57) ABSTRACT

The invention provides methods of reducing shrinkage stress in cross-linked polymerized materials by combining an addition-fragmentation chain transfer additive with a resin system prior to polymerization. The methods of the invention can improve the performance of conventional resin systems by reducing the shrinkage stress without significantly degrading the mechanical properties of the polymerized material. The shrinkage stress in the crosslinked polymeric materials produced by the methods of the invention may be from 25% to 75% of that of a control material produced by polymerization of the resin system alone to the same conversion.

32 Claims, 18 Drawing Sheets

(51) Int. Cl.
  *C08F 2/48* (2006.01)
  *C08F 222/10* (2006.01)
(52) U.S. Cl.
  CPC ..... *C08F 2222/102* (2013.01); *C08F 2222/1013* (2013.01); *C08F 2438/03* (2013.01)

(56) References Cited

U.S. PATENT DOCUMENTS

| | | | |
|---|---|---|---|
| 5,260,411 A | 11/1993 | Tesoro et al. | |
| 5,318,999 A * | 6/1994 | Mitra | A61K 6/083 433/168.1 |
| 5,495,643 A | 3/1996 | Katori | |
| 5,643,998 A | 7/1997 | Nakano et al. | |
| 5,654,368 A | 8/1997 | Nakano et al. | |
| 5,658,986 A | 8/1997 | Clouet | |
| 5,773,543 A | 6/1998 | Rizzardo et al. | |
| 5,866,047 A | 2/1999 | Nagino et al. | |
| 5,932,675 A | 8/1999 | Rizzardo et al. | |
| 5,977,278 A | 11/1999 | Rizzardo et al. | |
| 6,043,361 A | 3/2000 | Evans et al. | |
| 6,153,705 A | 11/2000 | Corpart et al. | |
| 6,294,708 B1 | 9/2001 | Gridnev | |
| 6,344,556 B1 | 2/2002 | Evans et al. | |
| 6,388,153 B2 | 5/2002 | Gridnev | |
| 6,596,899 B1 * | 7/2003 | Lai | 562/426 |
| 6,642,318 B1 | 11/2003 | Chiefari et al. | |
| 6,652,970 B1 | 11/2003 | Everarets et al. | |
| 6,667,376 B2 | 12/2003 | Charmot et al. | |
| 6,713,555 B2 | 3/2004 | Moszner et al. | |
| 6,812,291 B1 | 11/2004 | Corpart et al. | |
| 6,919,409 B2 | 7/2005 | Charmot et al. | |
| 6,933,361 B2 | 8/2005 | Wudl et al. | |
| 6,962,961 B2 * | 11/2005 | Lai | 526/222 |
| 7,888,400 B2 | 2/2011 | Abuelyaman et al. | |
| 7,943,680 B2 | 5/2011 | Bowman et al. | |
| 8,404,758 B2 | 3/2013 | Bowman et al. | |
| 8,455,565 B2 * | 6/2013 | Abuelyaman | A61K 6/083 106/35 |
| 8,877,830 B2 | 11/2014 | Bowman et al. | |
| 2001/0025128 A1 | 9/2001 | Gridnev | |
| 2005/0014910 A1 | 1/2005 | Lepilleur | |
| 2008/0194722 A1 | 8/2008 | Abuelyaman et al. | |
| 2008/0269460 A1 | 10/2008 | Bowman et al. | |
| 2012/0202917 A1 | 8/2012 | Bowman et al. | |
| 2012/0208965 A1 * | 8/2012 | Joly et al. | 525/386 |
| 2012/0295228 A1 * | 11/2012 | Abuelyaman | A61K 6/083 433/228.1 |

FOREIGN PATENT DOCUMENTS

| | | |
|---|---|---|
| WO | WO 88/04304 | 6/1988 |
| WO | WO 91/05779 | 5/1991 |
| WO | WO 93/22351 | 11/1993 |
| WO | WO 93/22355 | 11/1993 |
| WO | WO 94/14792 | 7/1994 |
| WO | WO 98/01478 | 1/1998 |
| WO | WO 98/58974 | 12/1998 |
| WO | WO 99/31144 | 6/1999 |
| WO | WO 99/35177 | 7/1999 |
| WO | WO 01/42379 | 6/2001 |
| WO | WO 03/102034 | 12/2003 |
| WO | WO 2004/087777 | 10/2004 |
| WO | WO 2006/004536 | 1/2006 |

OTHER PUBLICATIONS

Liu et al. One-Pot Hyperbranched Polymer Synthesis Mediated by Reversible Addition Fragmentation Chain Transfer (RAFT) Polymerization.*
Andrzjewska, E. (2001) "Photopolymerization kinetics of multifunctional monomers," *Prog. Polym. Sci.* 26 (2001) 605-665.

Barner-Kowollik et al. (Aug. 31, 2006) "Mechanism and Kinetics of Dithiolbenzoate-Mediated RAFT Polymerization. I. The Current Situation," *J. Polym. Sci. Part A: Polym. Chem.* 44:5809-5831.
Barner-Kowollik, Christopher: Ed. (2008) *Handbook of RAFT Polymerization*. pp. 235-239.
Braga et al. (2005) "Factors Involved in the Development of Polymerization Shrinkage Stress in Resin-Composites: A Systematic Review," *Dental Materials*. 21:962-970.
Burke FJT, Cheung SW, Mjor IA and Wilson NHF. Restoration longevity and analysis of reasons for the placement and replacement of restorations provided by vocational dental practitioners and their trainers in the United Kingdom. Quintessence International, (1999) ;30:234-242.
Carioscia JA, Lu H, Stanbury JW and Bowman CN. Thiol-ene oligomers as dental restorative materials. Dent Mater, (Dec. 2005);21:1137-1143.
Chan JW, Shin J, Hoyle CE, Bowman CN and Lowe AB. Synthesis, Thiol-Yne "Click" Photopolymerization, and Physical Properties of Networks Derived from Novel Multifunctional Alkynes. Macromolecules,(web May 13, 2010);43:4937-4942.
Chen et al. (Mar. 1, 2002) "A Thermally Re-Mendable Cross-Linked Polymeric Material," *Science* 295:1698-1702.
Cramer et al. Recent Advances and Developments in Composite Dental Restorative Materials. J Dent Res, (web Oct. 5, 2010);90:402-416.
Davidson et al. (1997) "Polymerization shrinkage and polymerization shrinkage stress in polymer-based restoratives," *J. Dentistry* 25(6):435-440.
Dewaele M, Truffier-Boutry D, Devaux J and Leloup G. Volume contraction in photocured dental resins: The shrinkage-conversion relationship revisited. Dent Mater, (Apr. 2006);22:359-365.
Decker (1996) "Photoinitiated crosslinking polymerization," *Progress in Polymer Science*. 21:593-650.
Eisenbach, C.D. (Oct. 1980) "Isomerization of Aromatic Azo Chromophores in Poly(ethyl acrylate) Networks and Photomechanical Effect," *Polymer* 21(10):1175-1179.
Evans et al. (2000) "Free-Radical Ring-Opening Polymerization of Cyclic Allylic Sulfides. 2. Effect of Substituents on Seven- and Eight-Membered Ring Low Shrink Monomers," *Macromolecules* 33(18):6722-6731.
Evans et al. (2001) "Free Radical Ring-Opening Polymerization of Cyclic Allylic Sulfides: Liquid Monomers with Low Polymerization Volume Shrinkage," *J. Polym. Sci. A* 39(1):202-215.
Fairbanks BD, Scott TF, Kloxin CJ, Anseth KS and Bowman CN. Thiol-Yne Photopolymerizations: Novel Mechanism, Kinetics, and Step-Growth Formation of Highly Cross-Linked Networks. Macromolecules, (web Dec. 10, 2008);42:211-217.
Finkelmann et al. (Jul. 2, 2001) "A New Opto-Mechanical Effect in Solids," *Phys. Rev. Lett.* 87(1):15501-15504.
Ge JH, Trujillo-Lemon M and Stansbury JW. A mechanistic and kinetic study of the photoinitiated cationic double ring-opening polymerization of 2-methylene-7-phenyl-1,4,6,9-tetraoxa-spiro[4.4]nonane. Macromolecules, (web Nov. 29, 2006);39:8968-8976.
Harrisson et al. (2002) "Substituent Effects on the Chain-Transfer Behavior of 7-Methylene-2-methyl-1,5-dithiacyclooctane ni the Presence of Disulfides and Thiols," *J. Poly Sci. A Poly Chem.* 40:4421-4425.
Jia et al. (web Sep. 22, 2006) "Synthesis of (ABCB)$_n$ Type Ternary Amphiphilic Multiblock Copolymer Via Poly(Ethylene Oxide) Macro-Chain Transfer Agent," *Polymer*. 47:7615-7620.
Khatri et al. (2000) "Synthesis, Characterization and Evaluation of Urethane Derivatives of Bis-GMA," *ACS Polymer Preprints*. 41(2):1724-1725.
Kleverlaan CJ and Feilzer AJ. Polymerization shrinkage and contraction stress of dental resin composites. Dent Mater,(Dec. 2005);21:1150-1157.
Kloxin et al. (web Mar. 10, 2009) "Stress Relaxation via Addition-Fragmentation Chain Transfer in a Thiol-ene Photopolymerization," *Macromolecules* 42:2551-2556.
Lai et al. (2002) "Functional Polymers from Novel Carboxyl-Terminated Trithiocarbonates as Highly Efficient RAFT Agents," *Macromolecules* 35:6754-6756.

(56) References Cited

OTHER PUBLICATIONS

Lee TY, Cramer NB, Hoyle CE, Stansbury JW and Bowman CN. (Meth)Acrylate Vinyl Ester Hybrid Polymerizations. J Polym Sci Pol Chem, (web Apr. 8, 2009);47:2509-2517.

Lendlein et al. (Apr. 14, 2005) "Light-Induced Shape-Memory Polymers," *Nature* 434:879-882.

Leung et al. (web Oct. 5, 2011) "Reducing Shrinkage Stress of Dimethacrylate Networks by Reversible Addition—Fragmentation Chain Transfer," *Macromol. Chem. Phys.* 213(2):198-204.

Li et al. Determination of Activation Energy for Glass Transition of an Epoxy Adhesive Using Dynamic Mechanical Analysis. Journal of Thermal Analysis and Calorimetry, 2000;60:377-390.

Lu H, Carioscia JA, Stansbury JW and Bowman CN. Investigations of step-growth thiol-ene polymerizations for novel dental restoratives. Dent Mater,(Dec. 2005) ;21:1129-1136.

Lu H, Stansbury JW, Dickens SH, Eichmiller FC and Bowman CN. Probing the origins and control of shrinkage stress in dental resin-composites: I. Shrinkage stress characterization technique. Journal of Materials Science-Materials in Medicine, (Oct. 2004);15:1097-1103.

Mayadunne RTA, Rizzardo E, Chiefari J, Krstina J, Moad G, Postma A, et al. Living polymers by the use of trithiocarbonates as reversible addition-fragmentation chain transfer (RAFT) agents: ABA triblock copolymers by radical polymerization in two steps. Macromolecules, (2000);33:243-245.

Meijs et al. (1988) "Preparation of Controlled-Molecular-Weight, olefin-Terminated Polymers by Free Radical Methods. Chan Transfer Using Allylic Sulfides," *Macromolecules* 21(10):3122-3124.

Meijs et al. (1991) "Use of Substituted Allylic Sulfides to Prepare End-Functional Polymers of Controlled Molecular Weight by Free-Radical Polymerization" *Macromolecules* 24:3689-3695.

Moad et al. (2006) *The Chemistry of Radical Polymerization*, 2nd ed., Elsevier Press, pp. 288-293, 296-300, 461-463, 498-499, 502-505.

Moad et al. (2010) "Reversible Addition Fragmentation Chain Transfer (RAFT) Polymerization," *Material Matters*. 5 (1):2-8.

Nicolay et al. (web Apr. 15, 2010) "Responsive Gels Based on Dynamic Covalent Trithiocarbonate Cross-Linker," *Macromolecules*. 43:4355-4361.

Park et al. (Nov. 2010) "Stress Relaxation by Addition-Fragmentation Chain Transfer in Highly Cross-Linked Thiol-Yne Networks," *Macromolecules* 43(24):10188-10190.

Park et al. (Oct. 2010) "Covalent adaptable networks as dental restorative resins: Stress relaxation by addition-fragmentation chain transfer in allyl sulfide systems," *Dental Materials* 26(10):1010-1016.

Pavlovic D, Linhardt JG, Kunzler JF and Shipp DA. Synthesis of Amphiphilic Multiblock and Triblock Copolymers of Polydimethylsiloxane and Poly(N,N-Dimethylacrylamide). J Polym Sci Pol Chem, (web Sep. 24, 2008);46:7033-7048.

Peutzfeldt, A. (1997) "Resin Composites in Dentistry: The Monomer Systems," *Eur. J. Oral Sci.* 105: 97-116.

Scott et al. (Jul. 2006) "Actuation in Crosslinked Polymers via Photoinduced Stress Relaxation," *Adv. Mater*. 18(16):2128-2132.

Scott et al. (Jun. 10, 2005) "Photoinduced Plasticity in Cross-linked Polymers," *Science* 308:1615-1617.

Scott TF, Cook WD, Forsythe JS, Bowman CN and Berchtold KA. FTIR and ESR spectroscopic studies of the photopolymerization of vinyl ester resins. Macromolecules, (2003);36:6066-6074.

Sideridou et al. (2002) "Effect of Chemical Structure on Degree of Conversion in Light-Cured Dimethylacrylate-Based Dental Resins," *Biomaterials*. 23:1819-1829.

Stansbury JW. Ring-Opening Polymerization of a 2-Methylene Spiro Orthocarbonate Bearing a Pendant Methacrylate Group. Polymers of Biological and Biomedical Significance, (1994) ;540:171-183.

Yu et al. (2008) "Reaction Behavior and Network Development in RAFT Radical Polymerization of Dimethacrylates," *Macromol. Chem. Physic*. 209:551-556.

Zhou et al. (web Feb. 23, 2011) "Kinetics of UV-Initiated RAFT Crosslinking Polymerization of Dimethylacrylates," *J. Appl. Polym. Sci.* 121:660-665.

Zhu S, Tian Y, Hamielec AE and Eaton DR. (1990) "Radical Trapping and Termination in Free-Radical Polymerization of Mma. Macromolecules"; 23:1144-1150.

\* cited by examiner a)

b)

REDUCING POLYMERIZATION-INDUCED SHRINKAGE STRESS BY REVERSIBLE ADDITION-FRAGMENTATION CHAIN TRANSFER

CROSS-REFERENCE TO RELATED APPLICATIONS

This application claims the benefit of U.S. Provisional Application 61/515,426, filed Aug. 5, 2011, which is hereby incorporated by reference herein to the extent not inconsistent herewith.

ACKNOWLEDGEMENT OF GOVERNMENT SUPPORT

This invention was made with government support under grant no. DE010959 awarded by the National Institutes of Health. The government has certain rights in the invention.

BACKGROUND OF THE INVENTION

Internal stress buildup during polymerization of a crosslinked network is a typical result of polymerization shrinkage. As used herein, internal stress is the stress that exists in a solid when no force is applied. Internal stress buildup may decrease the ultimate mechanical properties of the cured polymer and/or limit its applications. For example, in polymeric coatings and dental materials, internal stress may warp or crack the material or the underlying substrate. In addition, volumetric shrinkage during polymerization and the induced shrinkage stress in dental applications can result in tooth-composite adhesive failure.

Currently, commercial photoactivated dental restorative resins are based on dimethacrylates and the reaction mechanism is through chain-growth free radical polymerization. Existing dimethacrylate systems are popular for fillings and other dental prostheses because of their esthetic merit and "cure-on-command" feature.

The photoactivated restorative materials are often sold in separate syringes or single-dose capsules of different shades. If provided in a syringe, the user dispenses (by pressing a plunger or turning a screw adapted plunger on the syringe) the necessary amount of restorative material from the syringe onto a suitable mixing surface. Then the material is placed directly into the cavity, mold, or location of use. If provided as a single-dose capsule, the capsule is placed into a dispensing device that can dispense the material directly into the cavity, mold, etc. After the restorative material is placed, it is photopolymerized or cured by exposing the restorative material to the appropriate light source. The resulting cured polymer may then be finished or polished as necessary with appropriate tools. Such dental restoratives can be used for direct anterior and posterior restorations, core build-ups, splinting and indirect restorations including inlays, onlays and veneers.

BRIEF SUMMARY OF THE INVENTION

In one aspect, the invention provides an improved method of producing a cross-linked polymerized material. In an embodiment, the shrinkage stress of the crosslinked polymerized material is reduced by selecting a suitable reversible addition-fragmentation chain transfer additive, including a suitable amount of this additive in the mixture used to form the polymerized material and polymerizing the resulting mixture to form a cross-linked polymer network.

As referred to herein, reversible addition-fragmentation chain transfer additives (RAFT additives) include a RAFT functional group but do not include a separate polymerizable functional group. During the polymerization process, reaction of propagating radicals with RAFT additives may increase the gel point conversion, promote network rearrangement after gelation, or a combination thereof. In an embodiment, the type and amount of RAFT additive is selected to have a sufficiently high rate of reaction with the propagating radicals of the monomer(s) of the resin system to reduce the polymerization rate as compared to polymerization of an equivalent resin system not including a RAFT agent. The type of RAFT additive is selected in view of the type of monomer(s) included in the resin system. The amount of RAFT additive may be selected in view of several factors including the monomer concentration or the concentration of polymerizable functional groups and the concentration of initiator (other than the RAFT additive) in the resin system.

A significant advantage of this methodology is the ease with which it can be implemented to improve the performance of resin systems that are already being used by reducing the shrinkage stress without significantly degrading the mechanical properties of the polymerized material. This methodology does not require synthetic modification of the monomer, but rather simple addition of an additive. Therefore, the methods of the invention directly address the minimization of polymerization shrinkage stress without any need to modify the monomer structures.

In an embodiment, the invention provides a method for reducing internal stress in a crosslinked polymeric material, the method comprising the steps of a) forming a mixture by combining a RAFT additive comprising a RAFT functional group with a resin system comprising an initiator and at least one monomer having at least two polymerizable functional groups, wherein the molar ratio of RAFT functional groups to polymerizable functional groups in the resin system is from 0.005 to 0.05; and b) polymerizing the mixture to form a cross-linked polymeric material with at least 50% conversion of the polymerizable functional groups.

In step b), the mixture may be polymerized for 30 minutes or less or for 15 minutes or less. During the polymerization step, the initiator may be activated to produce free radicals; the initiator may be a photoinitiator. In an embodiment, the monomer has at least two acrylate or methacrylate groups. Such a monomer may be used in combination with a trithiocarbonate RAFT additive. The acrylate or methacrylate monomer may further comprise a bisphenol A-derived group or a urethane group. In an embodiment, the resin system may further comprise a second monomer having at least one polymerizable functional group; this polymerizable functional group may be an acrylate or methacrylate group. The molar ratio of RAFT additive to initiator may be greater than one and may be from 10 to 2000. The molar ratio of RAFT additive to polymerizable functional groups of the monomer(s) may be from 0.0025 to 0.1 (i.e. 0.25% to 10%), 0.0025 to 0.05 (i.e. 0.25% to 5%), 0.005 to 0.05 (i.e. 0.5% to 5%), or 0.005 to 0.025 (i.e. 0.5% to 2.5%). In an embodiment, the glass transition temperature of the crosslinked polymeric material is greater than 20° C.

In an embodiment, combination of the RAFT additive with the system including the monomer and the initiator results in the gel point occurring at a higher polymerizable group conversion value (gel point conversion) than would be obtained for polymerization of the resin system under similar conditions without the RAFT additive. In an embodiment, the functional group conversion value at the gel point is 10% or higher, 15% or higher, or 10-15%.

In another embodiment, combination of the RAFT additive with the system including the monomer and the initiator results in incorporation of RAFT functional groups into the crosslinked network. In an embodiment, at least some of the RAFT functional groups are incorporated mid-chain, rather than at the ends of the chains or in side chains.

A significant advantage of this methodology is the ease with which it can be implemented to improve the performance of resin systems that are already being used by reducing the stress in the crosslinked polymer material. The elastic modulus at a given temperature of the crosslinked polymeric material formed with the methods of the invention may be within 10%, 15%, 20% or 25% of the elastic modulus at the same temperature of a second (control) crosslinked polymeric material formed by polymerization of the first resin system to the same extent of conversion of polymerizable functional groups. The glass transition temperature of the crosslinked polymeric material formed via steps a) through d) may be within 5° C., 10° C., 15° C. or 20° C. of the glass transition temperature of the second crosslinked polymeric material. In an embodiment, the shrinkage stress in the crosslinked polymeric material may be from 25% to 75% of that of the second crosslinked polymeric material (ratio of shrinkage stress in first material to shrinkage stress in second material).

The crosslinked polymeric material may further comprise particles of filler material. In an embodiment, the filler particles are provided in the first monomer solution. A coupling agent may be applied to the filler particles.

In another aspect, the invention provides a mixture for forming a cross-linked polymeric material, the mixture comprising a monomer having at least two polymerizable functional groups, a RAFT additive and a photoinitiator. The polymerizable crosslinked polymeric material may be a dental material, a coating material, an optical material, an adhesive or a composite matrix material. The monomer(s) used in the mixture may be those described for use with the methods of the invention. In an embodiment, the monomer has at least two acrylate or methacrylate groups and a bisphenol A-derived group or a urethane group. The polymerizable composition may further include a second monomer having at least two acrylate or methacrylate groups. In an embodiment, the polymerizable composition further comprises filler particles. After formation, the mixture may be shielded from exposure to light to prevent premature gelation (e.g. by being kept in an amber or opaque container).

In another aspect, the invention provides cross-linked polymeric materials prepared by the methods of the invention. The polymeric material may be a dental material, a coating material, an optical material, an adhesive or a composite matrix material. In an embodiment, the monomer has at least two acrylate or methacrylate groups and a bisphenol A-derived group or a urethane group. The polymeric material may further include a second monomer having at least two acrylate or methacrylate groups. In an embodiment, the polymeric material further comprises filler particles.

DETAILED DESCRIPTION OF THE INVENTION

Figure 1:
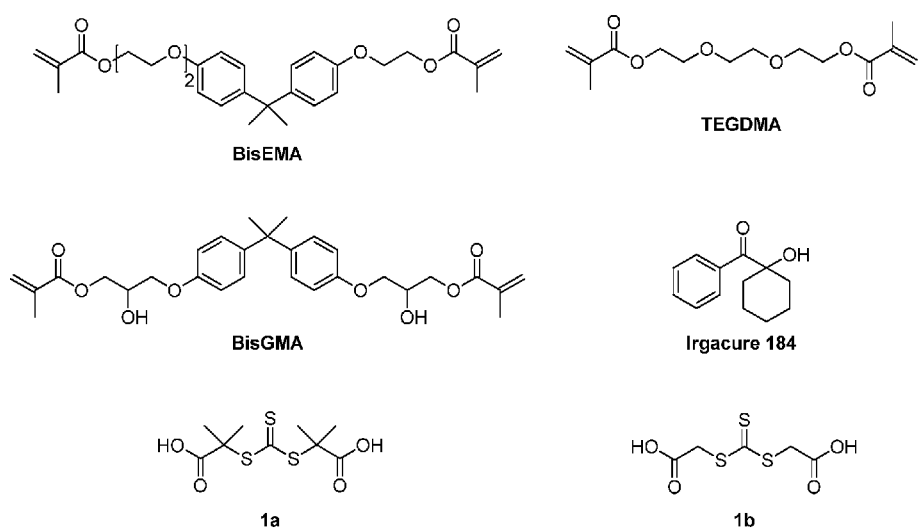
FIG. 1: Bisphenol A ethoxylate dimethacrylate (BisEMA), triethylene glycol dimethacrylate (TEGDMA), bisphenol A glycidyl methacrylate (BisGMA), (1-hydroxycyclohexyl)(phenyl)methanone (Irgacure 184), 2,2'-(thiocarbonylbis(sulfanediyl))bis(2-methylpropanoic acid) (1a), and bis(carboxymethyl)trithiocarbonate (1b).

As used herein, a polymeric material comprises a polymer and may further comprise non-polymeric additives. Crosslinked polymer networks may be characterized by the gel-point conversion, a critical transition point where there is a single sample spanning macromolecule. The gel-point conversion is defined mathematically as the conversion where the weight average molecular weight diverges. The polymerization mechanism used to form the crosslinked polymeric material may be any mechanism known to the art, including step-reaction (thiol-ene) and chain-reaction. In different embodiments, the crosslinked polymeric materials of the invention may have at least 50%, 60%, 70%, 80% or 90% conversion of the polymerizable functional groups.

Monomers suitable for the practice of the invention include those which are capable of forming cross-linked networks of polymer chains, either singly or in combination with one or more other monomers. Suitable monomers for the practice of the invention include, but are not limited to: ethylene oxides (for example, PEO), ethylene glycols (for example, PEG), vinyl acetates (for example, PVA), vinyl pyrrolidones (for example, PVP), ethyloxazolines (for example, PEOX), amino acids, saccharides, proteins, anhydrides, vinyl ethers, thiols, amides, carbonates, phenylene oxides (for example, PPO), acetals, sulfones, phenylene sulfides (for example, PPS), esters, fluoropolymers, imides, amide-imides, etherimides, ionomers, aryletherketones, olefins, styrenes, vinyl chlorides, ethylenes, acrylates, methacrylates, amines, phenols, acids, nitriles, acrylamides, maleates, benzenes, epoxies, cinnamates, azoles, silanes, chlorides, epoxides, lactones, isocyanates, hydroxides and amides.

In an embodiment, the resin system comprises a monomer having at least two polymerizable functional groups. The monomer may be free-radically polymerizable. The polymerizable functional groups may be ethylenically unsaturated and produce carbon centered radicals. In an embodiment, at least one of the monomers included in the resin system has at least two acrylate or methacrylate groups.

In an embodiment, a monomer with acrylate or methacrylate polymerizable groups may also comprise at least one bisphenol A-derived group In an embodiment, the bisphenol A (meth)acrylate monomer has a molecular weight from 200 to 800 amu. As used herein, a monomer including a bisphenol A-derived group includes the group:

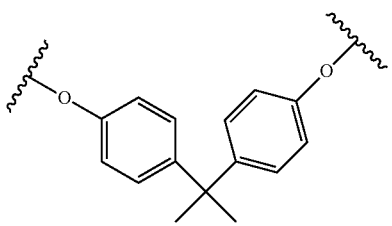 [SMILES: *Oc1ccc(C(C)(C)c2ccc(O*)cc2)cc1]

Suitable methacrylate monomers with bisphenol A-derived "cores" include Bisphenol A ethoxylate dimethacrylate (BisEMA) and bisphenol A glycidyl methacrylate (BisGMA), bisphenol A dimethacrylate (bis-DMA) Suitable acrylate monomers with bisphenol A-derived cores include Bisphenol A ethoxylate diacrylate.

In an embodiment, a monomer with acrylate or methacrylate polymerizable groups may also comprise at least one urethane group. In an embodiment, the urethane (meth)acrylate monomer has a molecular weight from 200 to 800 amu. In an embodiment, the monomer comprises from 2-4 or 2-6 urethane groups Hydrogen bonding between urethane groups can enhance the toughness of the polymer. Examples of acrylates/methacrylates with urethane groups include, but are not limited to 7,7,9-trimethyl-4,13-dioxo-3,14-dioxa-5,12-diazahexadecane-1,16-diyl bis(2-methylacrylate) and 2-(((((5-(((2-(methacryloyloxy)ethoxy)carbonyl)amino)-1,3,3-trimethylcyclohexyl)methyl)carbamoyl)oxy)ethyl methacrylate.

In additional to a monomer comprising (meth)acrylate polymerizable groups and a bisphenol A (BPA) or urethane functionality, the resin system may further comprise a second monomer. This monomer may reduce the viscosity of the resin system. In an embodiment, a second monomer need not be included in the resin system when the BPA (meth)acrylate monomer does not include hydrogen bonding sites. In an embodiment, the second monomer of the resin system includes (meth)acrylate groups and at least one ethylene glycol group. In an embodiment, the number of ethylene glycol groups is from 1 to 4. For example, the diluent may be ethylene glycol dimethacrylate (EGDMA), diethyleneglycol dimethacrylate (DEGDMA), triethyleneglycol dimethacrylate (TEGDMA) or tetraethylenegylcol dimethacrylate. In an embodiment, the resin system includes a 50 to 99 wt % of first monomer comprising at least two acrylate or methacrylate groups and a bisphenol A-derived group and 1 to 50 wt % of a second monomer comprising at least two acrylate or methacrylate groups and at least one ethylene glycol group. In an embodiment, the resin system includes a 50 to 80 wt % of first monomer comprising at least two acrylate or methacrylate groups and a bisphenol A-derived group and 20 to 50 wt % of a second monomer comprising at least two acrylate or methacrylate groups and at least one ethylene glycol group. In another embodiment, the resin system includes a 50 to 70 wt % of first monomer comprising at least two acrylate or methacrylate groups and 2 to 6 urethane groups and 30 to 50 wt % of a second monomer comprising at least two acrylate or methacrylate groups and at least one ethylene glycol group As used herein, "addition-fragmentation" is either a two-step or concerted chain transfer mechanism wherein addition of a radical is followed by fragmentation to generate a new radical species Reversible addition-fragmentation chain transfer additives (RAFT additives) for use in the present invention include groups with RAFT functionality and do not include a separate polymerizable functional group. As used herein, a RAFT functional group is a group which undergoes reversible addition-fragmentation type chain transfer. In an embodiment, the reversible addition-fragmentation chain transfer additive reacts with propagating radicals in a free radical polymerization. Scheme 1 illustrates a postulated mechanism of a free radical $R^1$ with trithiocarbonate compounds 1a or 1b. As shown in Scheme 1, the addition of 1a or 1b into a dimethacrylate system allows for free radicals to react with the trithiocarbonate core to produce a tertiary ($I^3a$) or a primary radical ($I^3b$), respectively, instead of further polymerizing, or terminating. This alternative reaction for the free radical will reduce the polymerization rate and the weight average molecular weight. The result of the reduction in the weight average molecular weight is a significant delay in the gel point conversion. Any delay in the gel point results in additional shrinkage being accommodated by flow which minimizes the stress build-up. The RAFT functional group may be incorporated centrally (mid-chain) into a polymer chain if the non-radical product of reaction with the RAFT additive with a first propagating radical (e.g. $I^2$ in scheme 1) reacts with a second propagating radical to form a new product incorporating both progatating radicals.

RAFT additives known to those skilled in the art include thiocarbonylthio compounds having the general formula ZC(=S)SR. Thiocarbonylthio compounds include tertiary dithiobenzoate RAFT agents, other aromatic dithioester RAFT agents, primary and secondary dithiobenzoate RAFT agents, bis-RAFT agents, dithioacetate and dithiophenylacetate RAFT agents, symmetrical trithiocarbonate RAFT agents, non-symmetrical trithiocarbonate RAFT agents, xanthate RAFT agents, and dithiocarbamate RAFT agents. Examples of different types of RAFT agents are given in Moad and Solomon, "The Chemistry of Radical Polymerization," $2^{nd}$ edition, 2006, Elsevier, page 501-514, hereby incorporated by reference.

The type of RAFT additive is selected in view of the type of monomer(s) included in the resin system. In an embodiment, the RAFT additive is selected to have a sufficiently high rate of reaction with the monomer(s) of the resin system to delay the gel point as compared to polymerization of an equivalent resin system not including a RAFT agent. In another embodiment, the RAFT additive is selected so that the RAFT functional group is incorporated midchain. RAFT additives suitable for use with acrylate and methacrylate monomers include trithiocarbonate compounds. Suitable trithiocarbonate compounds include, but are not limited to, s,s'-bis ($\alpha,\alpha'$-disubstituted-$\alpha$-acetic acid) trithiocarbonate compounds as described in U.S. Pat. No. 6,596,899, Lai, hereby incorporated by reference. In an embodiment, the RAFT additive is 2,2'-(thiocarbonylbis(sulfanediyl))bis(2-methylpropanoic acid) (compound 1a in Scheme 1). Other RAFT additives suitable for acrylate or methacrylate monomers include thiocarbonylthio compounds or other RAFT agents demonstrated to be reactive and reversible to acrylate or methacrylate addition. In an embodiment, the RAFT agent has a molecular weight from 200 to 800 amu.

The amount of RAFT additive may be referenced to the monomer concentration, the concentration of polymerizable functional groups or given as its concentration in the resin system. The molar ratio of RAFT additive or RAFT functional groups to polymerizable functional groups of the monomer(s) may be from 0.0025 to 0.1 (i.e. 0.25% to 10%), 0.0025 to 0.05 (i.e. 0.25% to 5%), 0.005 to 0.05 (i.e. 0.5% to 5%), or 0.005 to 0.025 (i.e. 0.5% to 2.5%). Alternately, the molar percentage of RAFT additive in the monomer solution may be from 0.5 to 5 mol %. Alternately, the weight percentage of RAFT additive in the monomer solution may be from 1 to 10 wt %.

The polymerization process is initiated by activating an initiator (typically other than the reversible addition-fragmentation chain transfer additive), which can act as a source of free radicals. In an embodiment, the source of free radicals is a photoinitiator or a thermally activated initiator. The source of free radicals may be activated by any method known to the art, including exposure to light, heat, or an electron beam. A photoinitiator may be activated by an artificial light source such as a UV lamp rather than by simple exposure to sunlight. In an embodiment, the concentration of the initiator is between 0.05 wt % and 5.0 wt % or 0.025 to 2.5 mol %. The time for which the initiator is activated (for example, the time for which light exposure occurs) may be referred to as the polymerization time. In different embodiments, the polymerization time may be 30 min. or less, 15 min. or less, 5-30 min, or 5-15 min.

The amount of RAFT additive may also be referenced to the concentration of initiator (other than the RAFT additive) in the resin system. In an embodiment, the molar ratio of RAFT additive to initiator may be from 10 to 2000 or from to 20 to 100, In an embodiment, the properties of a crosslinked polymeric material of the invention may be compared to those of a "control" crosslinked polymeric material formed by polymerization of the resin system in the absence of a RAFT agent. In an embodiment, the control material is polymerized to the same extent of polymerizable group conversion and the polymerization conditions for producing this control material are the same except the polymerization time may differ. For example, when a photoinitiator is used both the wavelength and intensity of the light used to activate the photoinitiator may be the same.

In different embodiments, the shrinkage stress in the crosslinked polymeric materials of the invention may be from 25% to 75% or 25% to 50% of that of the control material. The shrinkage stress may be measured by any method known to the art, including the method described in Example 1.

The elastic modulus at a given temperature of the crosslinked polymeric materials of the invention may be within 10%, 15%, 20% or 25% of the elastic modulus at the same temperature of a control material formed by polymerization. The elastic modulus may be measured by any method known to the art, including the method described in Example 1.

The glass transition temperature of the crosslinked polymeric material of the invention may be within 5° C., 10° C., 15° C. or 20° C. of the glass transition temperature of a control material. The storage modulus of at least partially non-crystalline polymers decreases in the glass transition region. One method of determining the glass transition temperature is to use dynamic mechanical analysis (DMA) to determine the peak of the curve of tan δ (ratio of loss to storage modulus, E"/E') as a function of temperature. The glass transition temperature determined by DMA is frequency dependent and generally increases with increasing frequency. In an embodiment, the measurement frequency is 1 Hz. The width of the tan δ peak is an indication of the breadth of the glass transition region. In different embodiments, the glass transition temperature of the crosslinked polymeric materials of the present invention (as determined from the peak of tan δ) is from 20° C. to 50° C., 20° C. to 100° C., 50° C. to 75° C. or 50° C. to 100° C. In an embodiment, the glass transition temperature is in the specified range and the full width of the tan δ peak at half maximum is from 10-30° C. or from 10-20° C. Other methods of measuring the glass transition temperature include thermal mechanical analysis (TMA) and differential scanning calorimetry (DSC); TMA and DSC are heating rate dependent.

The crosslinked polymeric materials of the invention may also comprise filler particles. For dental restorative materials, the filler particles may be silanized filler compounds such as barium, strontium, zirconia silicate and/or amorphous silica to match the color and opacity to a particular use or tooth. The filler is typically in the form of particles with a size ranging from 0.01 to 5.0 micrometers. The amount of filler particles may be 45 to 85% by weight (wt %) of the mixture.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, starting materials, and synthetic methods, other than those specifically exemplified can be employed in the practice of the invention without resort to undue experimentation. All art-known functional equivalents, of any such methods, starting materials, and synthetic methods, are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. Any preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

EXAMPLE 1

To overcome the significant issue of volumetric shrinkage stress in crosslinked multi(meth)acrylate networks, the addition of the trithiocarbonate 1a was employed, promoting reversible, free radical-mediated network rearrangement, that enables network adaptation, stress relaxation and ultimately mitigation of polymerization-induced shrinkage stress. Incorporation of 1a or 1b into a dimethacrylate system (70:30 BisEMA:TEGDMA) was examined through FT-IR kinetic studies, demonstrating that the polymerization rate was reduced in samples containing 1a, indicative of the changed polymerization mechanism. In addition, shrinkage stress studies showed that incorporation of as little as 2 wt % of 1a to 70:30 BisEMA:TEGDMA reduced the volumetric shrinkage stress by more than 50% compared to the pure dimethacrylate system, while maintaining the favorable mechanical properties of the methacrylate crosslinked networks (crosslinked density and $T_g$). This approach necessitates no synthetic modification of the methacrylate monomer units, allowing for ease of adaptation to almost any radically-polymerized system, to reduce shrinkage stress.

Photopolymerization reactions are ubiquitous in numerous industrial applications, ranging from dental restorative composites to polymer coatings to adhesives (1-9). Photopolymerizations have the ability to convert monomer resins rapidly and efficiently to crosslinked polymer networks with both spatial and temporal control of the polymerization reaction. Multifunctional methacrylate and acrylate monomers have been used extensively in free radically cured resins for the last 30 years because they possess numerous advantages, such as their fast curing rates and mechanical properties (i.e., strength) resulting from the formation of densely crosslinked networks (10-13).

Even with the numerous advantages of methacrylate-based systems, one major drawback is the volumetric shrinkage and the resulting stress that are inherent in the methacrylate polymerization reaction. Volumetric shrinkage stress is caused by the more dense packing of the molecules following the exchange of van der Waals bond distances in the monomer for covalent bonds in the polymer, which leads to bulk contraction (14-15). In specific, this densification occurs in multi(meth)acrylate systems since they undergo a chain growth polymerization, which causes high molecular weight polymers to form early in the polymerization with the formation of a covalently crosslinked gel structure at low functional group conversions (16). Due to early onset of gelation in these materials, subsequent shrinkage cannot be compensated through contraction of the material, leading to the development of stress (16). The inability to relieve the stress can lead to warping, debonding, microcracking, and to the ultimate failure of the material (14).

Numerous research groups have explored various methods to overcome this issue (9,17,18). Approaches taken include the implementation of ring opening polymerization (16,19,20), addition of molecular fillers (21), polymerization-induced phase separate (22-24), and attaching bulky pendant side chains to methacrylate monomers. In addition, thiol-ene polymerization has been explored, since it proceeds through a step growth process, allowing for a slow buildup of molecular weight and delaying gelation, allowing for shrinkage to occur prior to gelation, which in turn avoids the development of stress (8,16,25). In addition, in an attempt to improve the mechanical properties of thiol-ene systems, the combination of both methacrylate and thiol-ene monomers have been explored to produce a synergistic combination of attributes (16, 26, 27).

Recently, a distinct approach has been developed. Covalent adaptable networks (CANs) have been explored as a successful strategy to reduce polymerization-induced volumetric shrinkage stress: in these systems the network connectivity continuously rearranges throughout the polymerization, which promotes network relaxation and alleviates polymerization shrinkage stress (28). In specific, this approach was implemented in thiol-ene systems in which allyl sulfide moieties, acting as an addition-fragmentation functional group, were incorporated into the monomer units (29-31).

Here, we propose the use of reversible addition-fragmentation chain transfer (RAFT) agents as a means to allow rearrangement by RAFT during the polymerization, to alleviate stress and reduce volumetric shrinkage stress. Samples containing 1a or 1b (FIG. 1) with dimethacrylate monomers were formulated to enable the free radical-mediated rearrangement of the network via the trithiocarbonate and a series of reversible addition-fragmentation chain transfer reactions (Scheme 1). Compounds 1a and 1b were selected because they contain the trithiocarbonate functionality, which is one of the well known RAFT-capable functional groups, to promote rearrangment via the addition-fragmentation chain transfer reaction simultaneously with network formation (32, 33).

As shown in Scheme 1, the addition of 1a or 1b into a dimethacrylate system allows for free radicals to react with the trithiocarbonate core to produce a tertiary ($I^3a$) or a primary radical ($I^3b$), respectively, instead of further polymerizing, or terminating. This alternative reaction for the free radical will reduce the polymerization rate and the weight average molecular weight. The result of the reduction in the weight average molecular weight is a significant delay in the gel point conversion. Any delay in the gel point results in additional shrinkage being accommodated by flow which minimizes the stress build-up.

ization rate, shrinkage stress and mechanical properties were examined to determine the effect of the addition of 1a and 1b on the dimethacrylate system.

Experimental Section

Materials

All commercially obtained reagents were used as received. Bisphenol A ethoxylate dimethacrylate (BisEMA) and triethylene glycol dimethacrylate (TEGDMA) were donated by Esstech Inc. (Essington, Pa.). Bis(carboxymethyl)trithiocarbonate (1b), carbon disulfide, mineral spirits, 50% solution of sodium hydroxide, and ammonium bisulfate were obtained from Sigma Aldrich. Irgacure 184 ((1-hydroxycyclohexyl)(phenyl)methanone) was obtained from BASF. 3-mercaptopropyltrimethoxysilane was purchased from Gelest.

Characterization

A Bruker Avance-III 300 MHz spectrometer was used to obtain $^1H$ and $^{13}C$ NMR spectra, which were referenced using the solvent residual peak.

Synthesis of 2,2'-(thiocarbonylbis(sulfanediyl))bis(2-methylpropanoic acid) (1a). Compound 1a was synthesized following a modified published procedure (35). Carbon disulfide (25 mL, 0.4157 mol), chloroform (90 mL, 1.125 mol), acetone (85 mL, 1.149 mol), ammonium bisulfate (2.8199 g, 8.31 mmol), and mineral spirits (125 mL) were added to a 2 L erlenmeyer flask. The mixture was stirred with a mechanical mixer, purged with nitrogen, and chilled in an ice water bath. Sodium hydroxide (50%, 420 mL) was added dropwise over 90 min to keep the temperature below 25° C. The reaction was stirred overnight in an ice water bath. An orange precipitate was produced. Addition of $H_2O$ (1.5 L) dissolved the solid. While chilling the mixture in an ice water bath, concentrated HCl (720 mL) was added to form an orange precipitate. The mixture was stirred for 30 min in the ice water bath, while being purged with nitrogen. The orange solid was filtered and washed with aqueous HCl (1 M) then stirred in a toluene:acetone (4:1, 20 mL) mixture for 1 h. The suspension was filtered to afford pure 1a (53.44 g, 45.5%) as a yellow solid. $^1H$ NMR (DMSO-$d_6$, 300 MHz, δ): 12.91 (s, 2H, $CO_2H$), 1.59 (s, 12H, $CH_3$). $^{13}C$ NMR (DMSO-$d_6$, 300 MHz, δ): 219.0 (C=S), 173.0 (C=O), 56.2 ($\underline{C}(CH_3)_2$), 24.9 ($CH_3$). MS (ESI(−)) m/z (%): 585 (10) [2M-2H+Na]$^-$, 563 (7) [2M-H]$^-$, 237 (5) [M-H—$CO_2$]$^-$, 119 (100) [M-2H—$CO_2$]$^{2-}$.

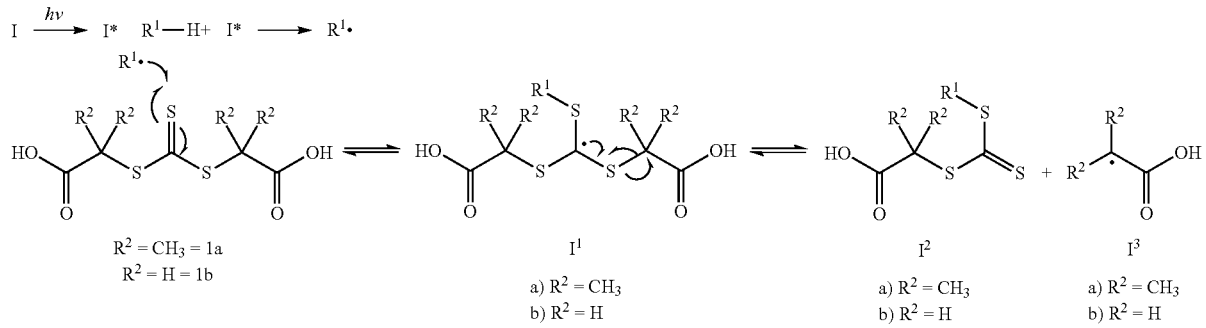

Scheme 1. Postulated mechanism of addition-fragmentation chain transfer of the photopolymerization of dimethacrylate with compounds 1a or 1b.

Recently, Matyjaszewski and coworkers have conducted illuminating studies demonstrating that incorporating trithiocarbonate dimethacrylates into poly(methyl methacrylate) and polystyrene gels through radical polymerization enables these materials to self-repair. The trithiocarbonate rearranges to promote macroscopic healing in these materials (34), indicating also the potential for similar RAFT-capable materials to mitigate stress in the network.

The significant advantage of this methodology for reducing shrinkage stress is the ease with which it is implemented to improve the performance of resin systems that are already being used. It does not require synthetic modification of the monomer, but rather simple addition of an additive. This method directly addresses the minimization of polymerization shrinkage stress without any need to modify the monomer structures.

To demonstrate that the use of RAFT-capable functional groups can reduce the shrinkage stress in methacrylate systems, compounds 1a and 1b were added to a dimethacrylate system (70:30 BisEMA:TEGDMA) (FIG. 1). Polymer- Resin Formulation and Photopolymerization In a beaker equipped with a stir bar, 0.1 wt % of Irgacure 184, and a 99.9 wt % of BisEMA:TEGDMA (70:30 wt %) were added, named solution A. Solution A was stirred overnight in the dark. Solutions containing 0.5, 1, 1.5, and 2 wt % of 1a were prepared by addition of 1a to the necessary amount of previously prepared solution A (70:30 BisEMA:TEGDMA with 0.1% Irgacure 184). Solutions containing 0.5 wt % and 1 wt % of 1a were stirred overnight in the dark to dissolve 1a in solution A, while solutions containing 1.5 wt % and 2 wt % of 1a required an addition of 1 mL of methanol to dissolve the solid 1a. Methanol was then removed in vacuo to afford the resin mixtures. Solutions containing 1b were prepared in the same manner as described for 1a, where solutions containing 0.5 wt % and 1 wt % of 1b were stirred overnight, and solutions containing 1.5 wt % and 2 wt % of 1b were mixed with 1 mL of methanol, followed by removal of the solvent in vacuo.

FT-IR Studies

Formulated resins were sandwiched between two glass slides, which were separated by a 0.8 mm thick silicone rubber mold. The resin was than irradiated in situ using an EXFO Acticure lamp equipped with a 365 nm filter, where an optical light guide was used to direct the light source. Uniform irradiation across the sample surface was aided by the use of a collimating lens mounted at the end of the light guide. The curing light irradiation intensity used was 1 mW/cm$^2$, which was measured using an International Light IL1400A radiometer at the sample surface. Polymerization conversion studies were performed using a Nicolet Magna infrared spectrometer, equipped with a custom-built horizontal sample chamber to monitor the conversions of methacrylate functional groups, by following the ene C—H stretch peak area, centered at 6165 cm$^{-1}$.

Shrinkage Stress Studies

A cantilever-type tensometer (American Dental Association Health Foundation) equipped with a stainless steel bar was coupled with a FT-IR spectrometer via optical fibers, to simultaneously monitor polymerization stress and functional group conversion (36). The ends of cylindrical quartz rods (6 mm diameter) were polished on a polishing wheel with a 320 grit silicon carbide paper, and then carefully cleaned by immersing in freshly prepared Piranha solution. After rinsing with de-ionized water and wiping dry, the ends of the quartz rods that were to come in contact with the resin were brushed with Fushion dental bonding solution (3-mercaptopropyltrimethoxysilane) to ensure adhesion at the resin-quartz interfaces. The quartz rods were then secured with collets to the tensometer base and to the stainless steel bar cantilever, with the treated rod ends facing one another, with a 1 mm gap between them. For each run, resin was injected into the 1 mm gap between the rods, and then cured with 1 mW/cm$^2$ of 365 nm filtered light from an EXFO Acticure lamp. A fiber optic light guide was used to deliver the light through the bottom glass rod, from the end opposite to the resin. The tensile force developed by the sample shrinkage stress generated during polymerization was monitored by the stainless steel bar deflection via a linear variable differential transformer (LVDT). The resulting shrinkage stress values were monitored for 16 min, where there was no light exposure for the first minute, followed by a 15 min light exposure. Prior to the measurement, the deflection was calibrated using a force transducer. This calibration constant (i.e., the beam compliance) and the quartz rod area were used to convert the LVDT readings to stress measurements. Optical fibers were positioned transverse through the sample to carry an IR signal to and from a Nicolet Magna IR spectrometer. The methacrylate conversion was determined by monitoring the area of the peak centered at 6165 cm$^{-1}$ throughout the polymerization time. Shrinkage stress measurements were performed in triplicate. All polymerizations were performed at ambient temperature.

DMA Studies

Dynamic mechanical analysis (DMA) was performed using a TA Instrument Q800 dynamic mechanical analyzer in triplicate runs, scanning at 1° C./min from −10 to 200° C. at a frequency of 1 Hz and a strain of 0.3% of tension. Reported values were from the second heating scans to ensure the absence of dark polymerization at temperatures greater than the glass transition temperature ($T_g$). See FIGS. 7 and 8 for data from additional heating scans. Samples analyzed with the DMA were cured using a collimating lens at the end of the light guide to promote uniform irradiation across the sample surface. The cured samples were finished with 400 grit sandpaper, then placed between tension clamps in the DMA.

Results and Discussion

Kinetic Studies

To examine the effect on polymerization rate when incorporating 1a or 1b into a dimethacrylate system (70:30 BisEMA:TEGDMA), solutions containing 0.5, 1, 1.5, and 2 wt % of either 1a or 1b were prepared with 70:30 BisEMA:TEGDMA mixture, where a 0.1 wt % of Irgacure 184 was used as the photoinitiator (Table 1). This mixture of BisEMA and TEGDMA was chosen to mimic the dental material formulation comprised of BisGMA and TEGDMA, where volumetric shrinkage stress is a major issue, causing microcracking and debonding (9). BisEMA was used instead of BisGMA, due to the reduced viscosity, to ease in handling of the resins. The resins were subsequently cured with 365 nm light at 1 mW/cm$^2$ and the methacrylate functional group conversion was monitored by real time FT-IR spectroscopy.

Figure 2A:
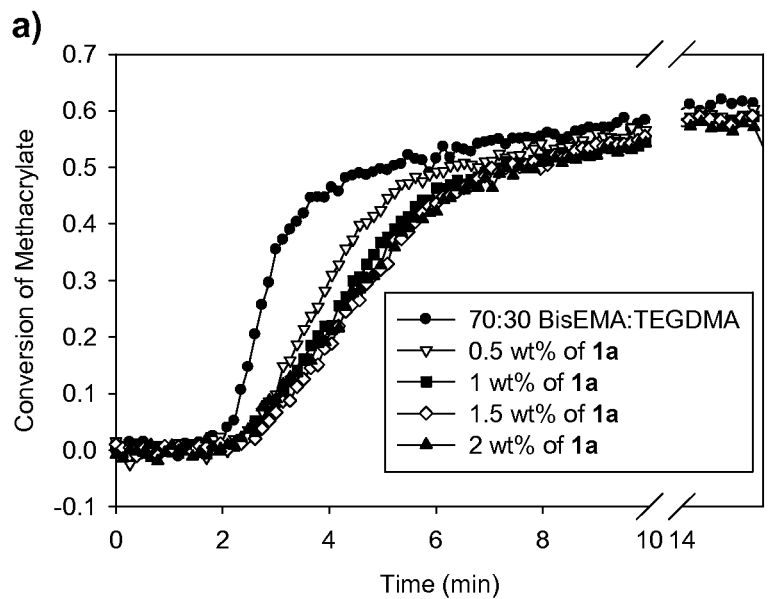
FIG. 2: Functional group conversion of methacrylate obtained from real time FT-IR spectroscopy of samples containing different ratios of: a) 1a to 70:30 BisEMA:TEGDMA and b) 1b to 70:30 BisEMA:TEGDMA. Samples were formulated with 0.1 wt % of Irgacure 184 and irradiated with an EXFO Acticure with 365 nm light at 1 mW/cm² intensity for 15 minutes.
Figure 2B:
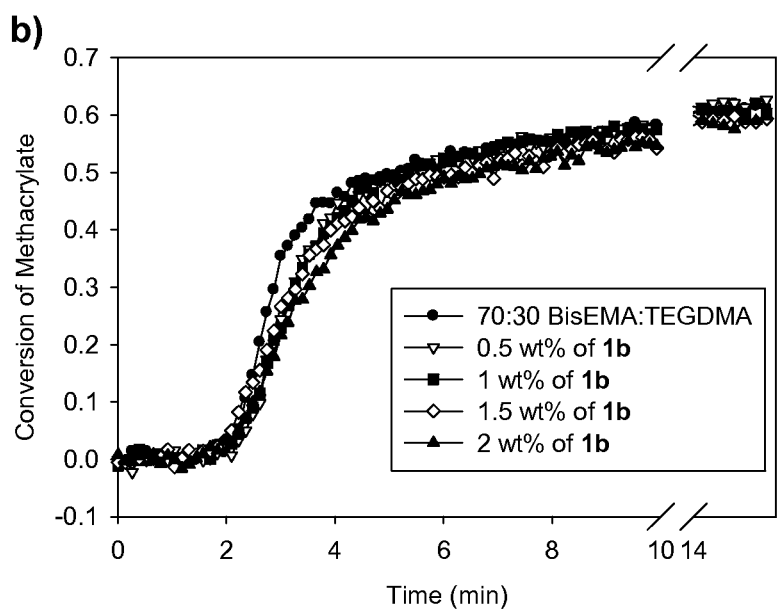

The methacrylate conversion in these samples is shown in FIG. 2, where an inhibition time of approximately 2 minutes was observed for all samples. The pure methacrylate sample (70:30 BisEMA:TEGDMA) has the highest conversion and the fastest polymerization rate compared to samples containing either 1a or 1b as no addition-fragmentation is occurring to limit the polymerization rate. As shown in FIG. 2a, the polymerization rates are slower for all samples containing various amounts of 1a. There was a correlation between the decrease in the polymerization rate and the increased amount of 1a added to the 70:30 BisEMA:TEGDMA mixture. The increased concentration of 1a enhances the probability that free radicals will react with 1a, rather than with the methacrylate, slowing polymerization rate. In contrast, the samples containing 1b (FIG. 2b) produced similar polymerization rates and final conversions as the pure dimethacrylate control samples (70:30 BisEMA:TEGDMA), even with increasing amounts of 1b. This outcome suggests that 1b plays no reactive role in the polymerization or that it's corresponding radical is less stable (I$^3$b), and it reinitiates polymerization essentially as soon as it is generated, leading to no net effect on the polymerization rate.

To reduce the shrinkage stress in the dimethacrylate system, reaction with the trithiocarbonate moiety is necessary both to increase the gel point conversion and to promote network rearrangement after gelation. Thus, a high rate of reaction with the RAFT-moiety is desired as indicated by the reduced polymerization rate in the case of inclusion of 1a. With compound 1b this is not clear from the polymerization data, without examining the shrinkage stress measurements because of the two possibilities outlined above.

TABLE 1

The compositions of samples examined.

| Composition | Wt % Irgacure 184 | Wt % BisEMA | Wt % TEGDMA | Wt % 1a or 1b |
|---|---|---|---|---|
| 70:30 BisEMA:TEGDMA | 0.1 | 69.9 | 30.0 | 0 |
| 0.5 wt % of 1a or 1b | 0.1 | 69.6 | 29.8 | 0.5 |
| 1 wt % of 1a or 1b | 0.1 | 69.2 | 29.7 | 1 |
| 1.5 wt % of 1a or 1b | 0.1 | 68.9 | 29.5 | 1.5 |
| 2 wt % of 1a or 1b | 0.1 | 68.5 | 29.4 | 2 |

TABLE 2

Shrinkage stress and percent conversion of methacrylate for tensometer experiments.

| Composition[a] | Shrinkage Stress (MPa)[b] | % Conversion of Methacrylate[b,c] | % Conversion Upon Start of Shrinkage Stress[b] |
|---|---|---|---|
| 70:30 BisEMA:TEGDMA | 1.32 ± 0.1 | 65 ± 2% | 45 ± 4% |
| 1.5 wt % of 1b[d] | 0.98 ± 0.1 | 65 ± 3% | 46 ± 2% |
| 2 wt % of 1b[d] | 0.99 ± 0.01 | 65 ± 3% | 46 ± 2% |
| 1.5 wt % of 1a[d] | 0.82 ± 0.02 | 62 ± 1% | 43 ± 4% |
| 2 wt % of 1a[d] | 0.61 ± 0.01 | 63 ± 0.1% | 49 ± 1% |

[a] Samples were cured with an EXFO Acticure with 365 nm light at 1 mW/cm² intensity for 15 minutes, with 0.1 wt % of Irgacure 184;
[b] Average of triplicate runs and standard deviation;
[c] Monitored through FT-IR of area of peak centered at 6165 cm⁻¹;
[d] Other percent of composition was 70:30 BisEMA:TEGDMA.

Shrinkage Stress Studies

Figure 3A:
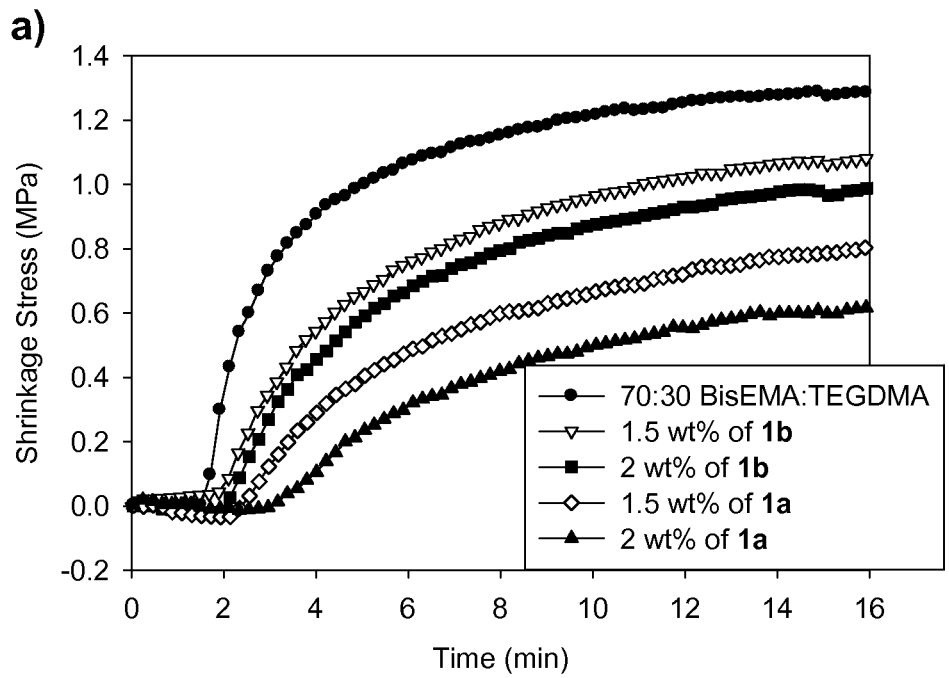
FIG. 3: a) Polymerization shrinkage stress measurements over time of photopolymerization. b) Conversion of methacrylate versus the shrinkage stress development during photopolymerization. One replicate shown here, see FIGS. 5 and 6 for Information for triplicate runs of samples. All samples contained 70:30 BisEMA:TEGDMA and 0.1 wt % of Irgacure 184. The resulting shrinkage stress data were obtained for 1 min of no light exposure followed by 15 min of irradiation with an EXFO Acticure with 365 nm light at 1 mW/cm².
Figure 3B:
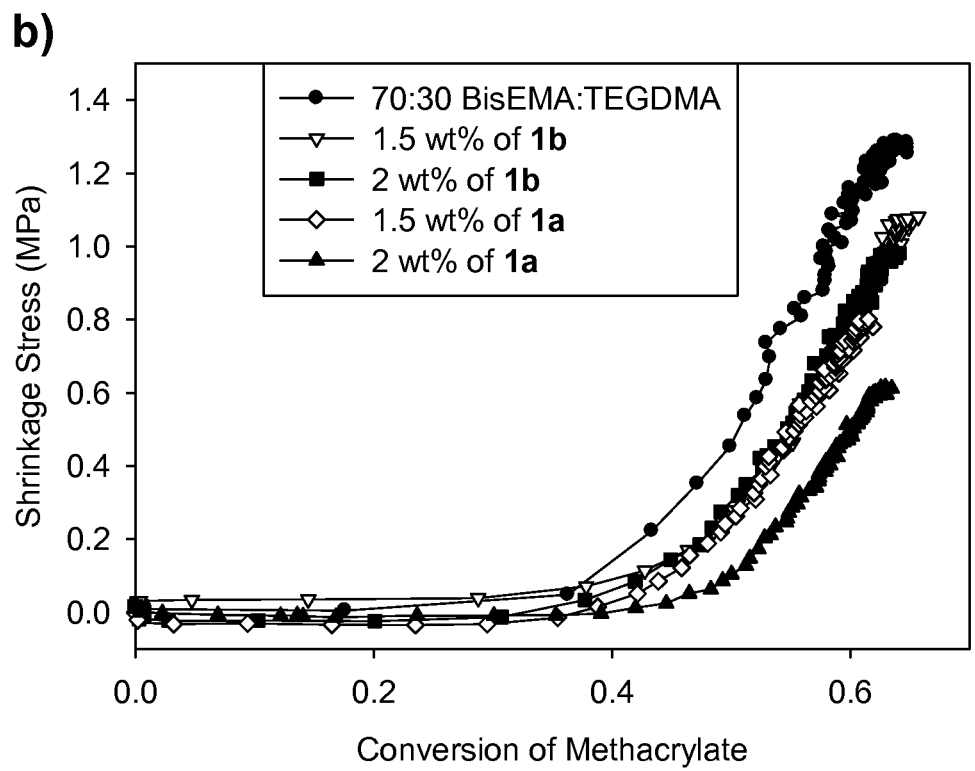

Shrinkage stress measurements were carried out to determine whether the incorporation of 1a or 1b into the dimethacrylate system would reduce the volumetric shrinkage stress through free radical addition-fragmentation chain transfer with the trithiocarbonate core during the formation of the methacrylate crosslinked network. To measure polymerization shrinkage stress, a cantilever beam-based tensometer technique coupled with FT-IR spectroscopy was used to simultaneously capture both stress and reactive functional group conversion of the curing resin. Shown in FIG. 3, the final shrinkage stress in samples containing 1a was reduced compared to the pure dimethacrylate system (70:30 BisEMA:TEGDMA). Shown in Table 2, the final conversion of methacrylate in all five different compositions were similar, while the shrinkage stress of samples with 1.5 and 2 wt % of 1a was significantly reduced, a difference of 0.5 MPa and 0.71 MPa, respectively from the pure dimethacrylate system (70:30 BisEMA:TEGDMA). The reduction of shrinkage stress is significant, even though only a small amount of 1a was added to the resin mixture.

Unfortunately, addition of 1.5 or 2 wt % of 1b to 70:30 BisEMA:TEGDMA had little effect on reducing the shrinkage stress. The samples containing 1.5 and 2 wt % of 1b only reduced shrinkage stress by 0.34 and 0.33 MPa, respectively, as compared to the pure dimethacrylate samples. These results are consistent with the kinetic studies, suggesting that 1b has only minimal participation in the desired addition-fragmentation reaction pathway during the formation of the methacrylate crosslinked networks. In comparison, increasing the weight percent of 1a from 1.5 to 2 wt % reduced the shrinkage stress significantly from 0.82 to 0.61 MPa, respectively, as a result of increased RAFT reactions relative to polymerization.

In addition, it is evident that shrinkage stress develops at a higher percent of conversion of methacrylate with samples containing 1a (Table 2). As shown in Table 2, samples containing 2 wt % of 1a in 70:30 BisEMA:TEGDMA, started developing stress at 49±1% methacrylate conversion, while for the pure dimethacrylate system (70:30 BisEMA:TEGDMA) the measurable stress evolution began at 45±4% conversion (values were averages of triplicate runs). This result suggests that gelation is occurring later in the polymerizations with samples containing 1a, so that bulk flow can counteract shrinkage and reduce stress build-up.

DMA Studies

Figure 4A:
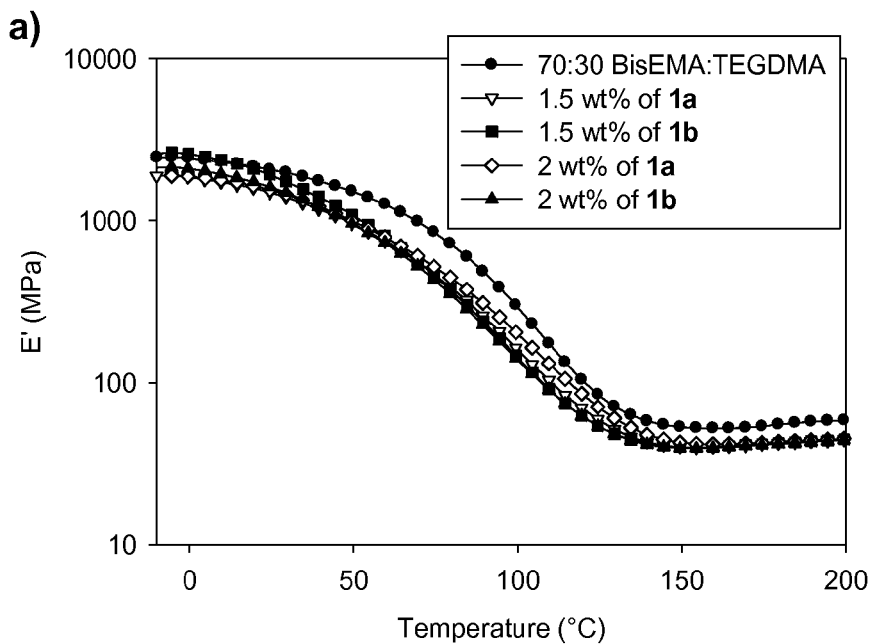
FIG. 4: a) Elastic modulus: and b) Tan δ: versus temperature for dimethacrylate system (70:30 BisEMA:TEGDMA), and samples containing different weight percent of either 1a or 1b added to the 70:30 BisEMA:TEGDMA. Samples were formulated with 0.1 wt % of Irgacure 184 and irradiated at 365 nm, 1 mW/cm² for 15 min.

The network properties of the cured samples were investigated through dynamic mechanical analysis (DMA) to determine if the desirable mechanical properties of the dimethacrylate system were maintained with the addition of 1a. As shown by the DMA measurements (FIG. 4), the mechanical properties were almost unchanged with addition of 1.5 and 2 wt % 1a to 70:30 BisEMA:TEGDMA. The crosslink density did not change significantly with samples containing 1a or 1b as compared to the dimethacrylate control system (70:30 BisEMA:TEGDMA), even when a reduction in shrinkage stress was observed with samples containing 1a (FIG. 4a). In addition, the $T_g$ was not significantly changed: a reduction in $T_g$ by 10° C. was observed for samples containing 1a or 1b as compared to the dimethacrylate system, but the $T_g$ remained high (100° C.). The addition of 1a produced desirable materials with highly crosslinked networks and a high $T_g$, while reducing the detrimental shrinkage stress. In addition, one should note that only a small weight percent of 1a was necessary to achieve these desirable results.

Figure 4B:
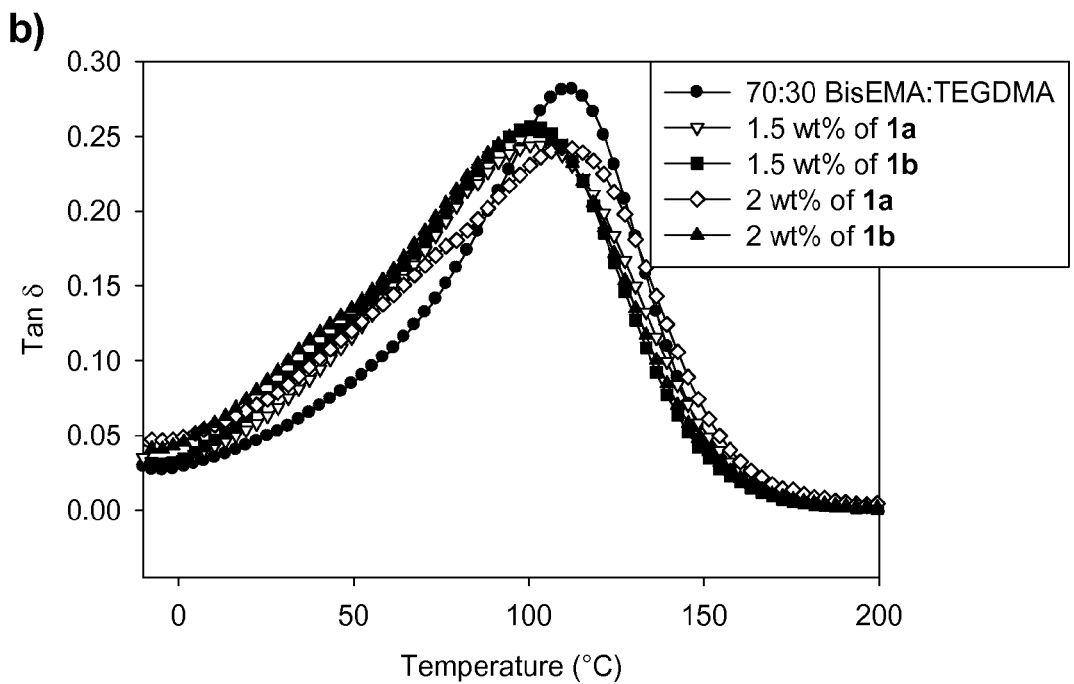
Figure 5A:
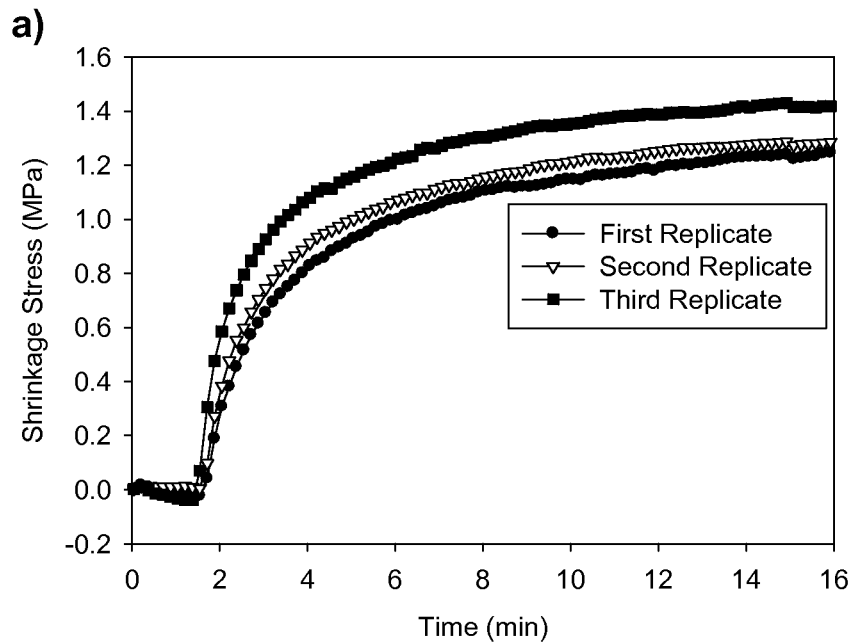
FIG. 5: Polymerization shrinkage stress measurements over time of photopolymerization for triplicate runs of: a) 70:30 BisEMA:TEGDMA. b) 1.5 wt % 1b and 98.4 wt % 70:30 BisEMA:TEGDMA. c) 2 wt % 1b and 97.9 wt % 70:30 BisEMA:TEGDMA. d) 1.5 wt % 1a and 98.4 wt % 70:30 BisEMA:TEGDMA. e) 2 wt % 1a and 97.9 wt % 70:30 BisEMA:TEGDMA. All samples contained 0.1 wt % of Irgacure 184. The resulting shrinkage stress data were obtained for 1 min of no light exposure followed by a 15 min of irradiation with an EXFO Acticure with 365 nm light at 1 mW/cm².
Figure 5B:
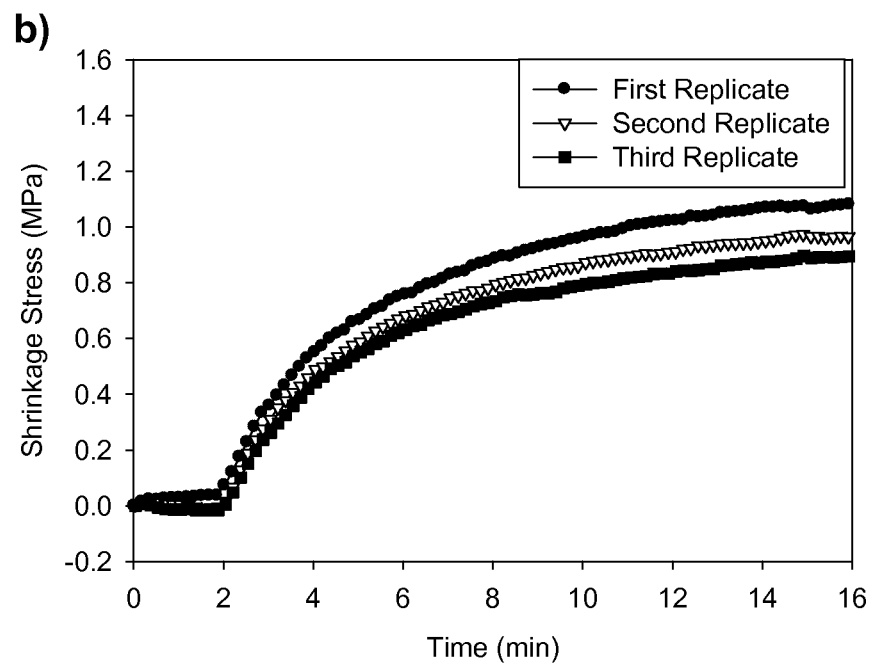
Figure 5C:
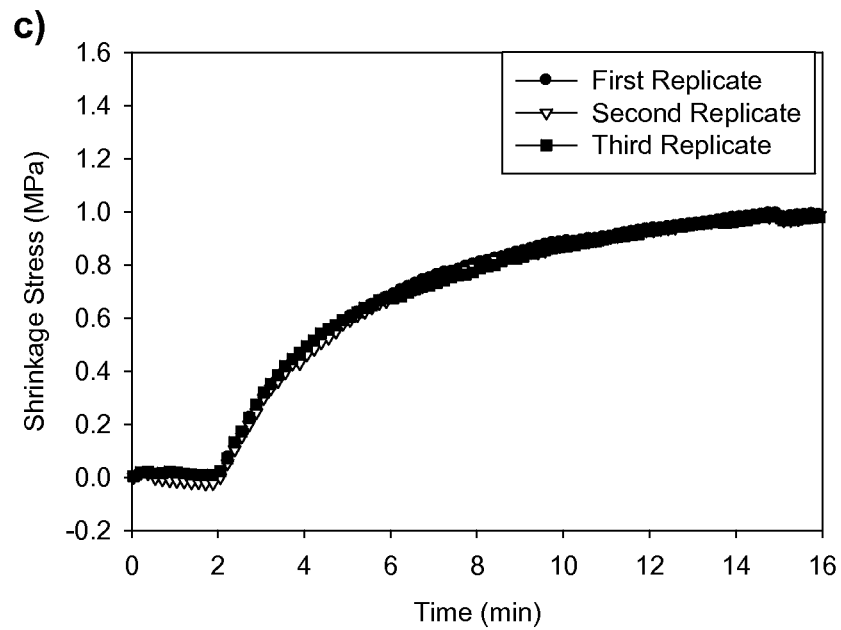
Figure 5D:
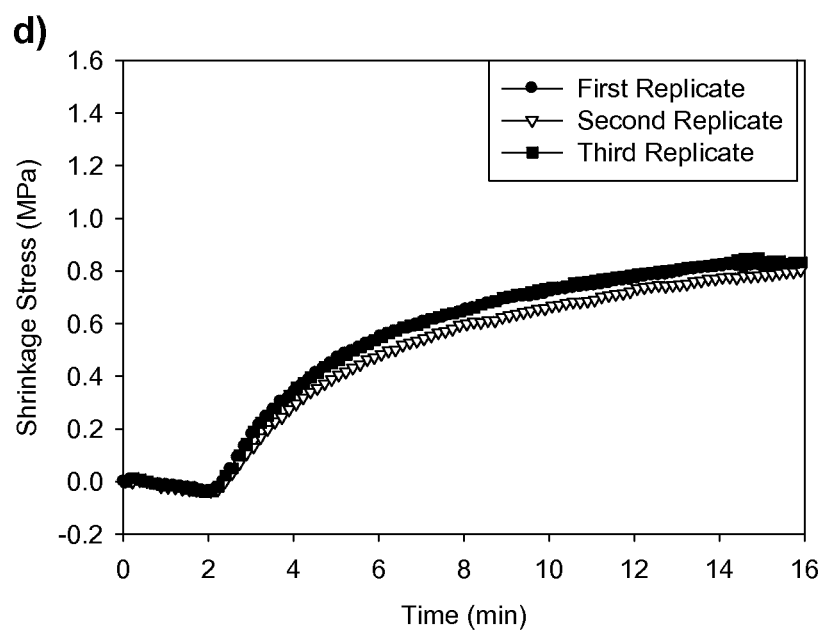
Figure 5E:
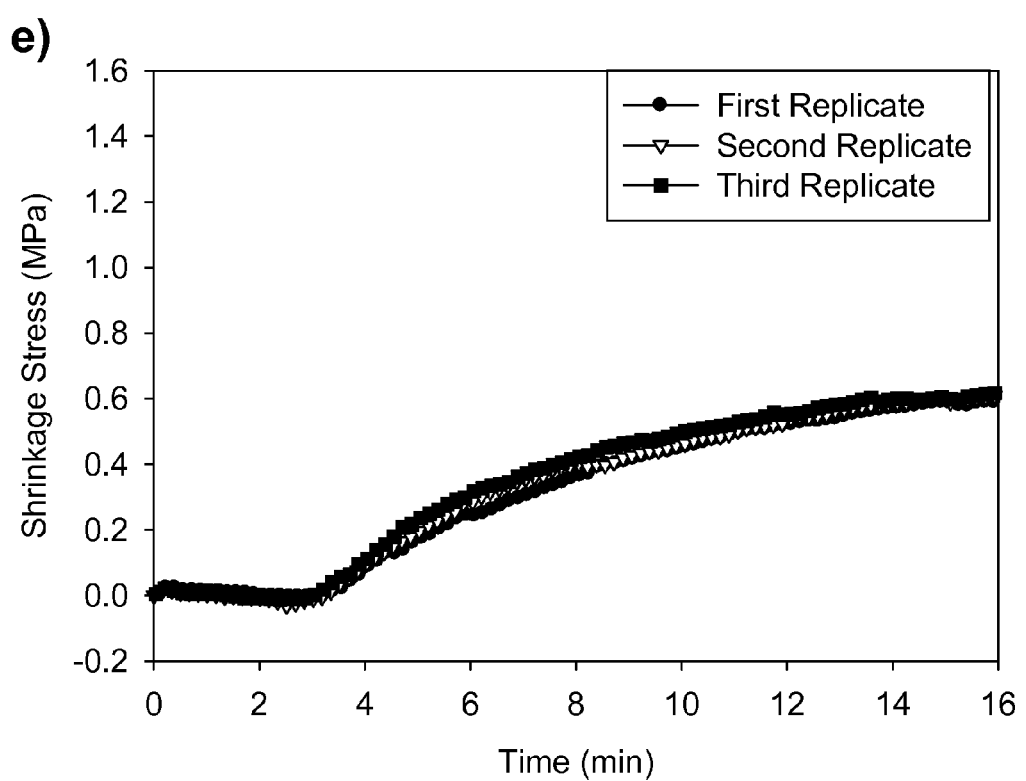
Figure 6A:
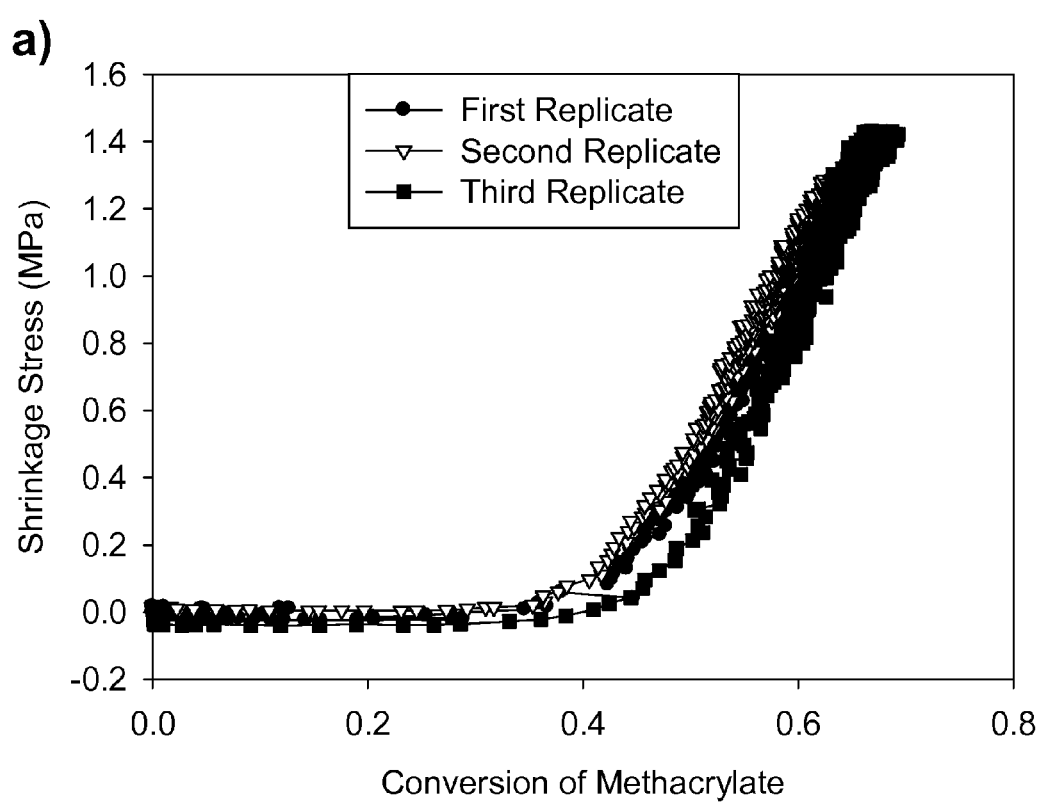
FIG. 6: Shrinkage stress development with conversion of methacrylate during photopolymerization for triplicate runs of: a) 70:30 BisEMA:TEGDMA. b) 1.5 wt % 1b and 98.4 wt % 70:30 BisEMA:TEGDMA. c) 2 wt % 1b and 97.9 wt % 70:30 BisEMA:TEGDMA. d) 1.5 wt % 1a and 98.4 wt % 70:30 BisEMA:TEGDMA. e) 2 wt % 1a and 97.9 wt % 70:30 BisEMA:TEGDMA. All samples contained 0.1 wt % of Irgacure 184. The resulting shrinkage stress data were obtained for 1 min of no light exposure followed by a 15 min of irradiation with an EXFO Acticure with 365 nm light at 1 mW/cm².
Figure 6B:
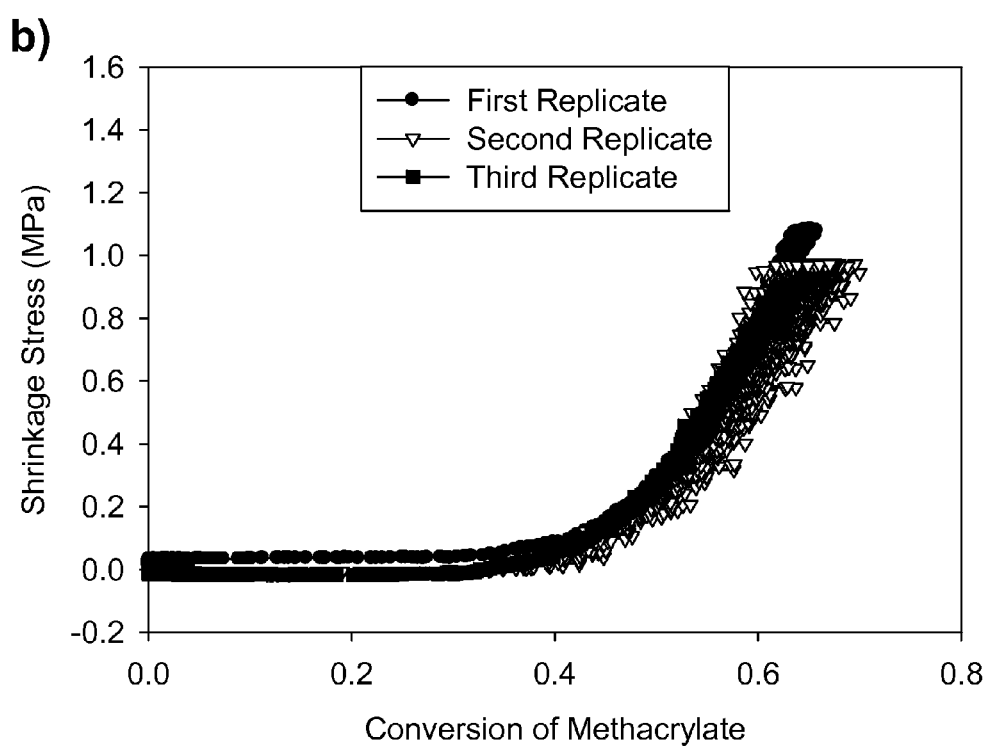
Figure 6C:
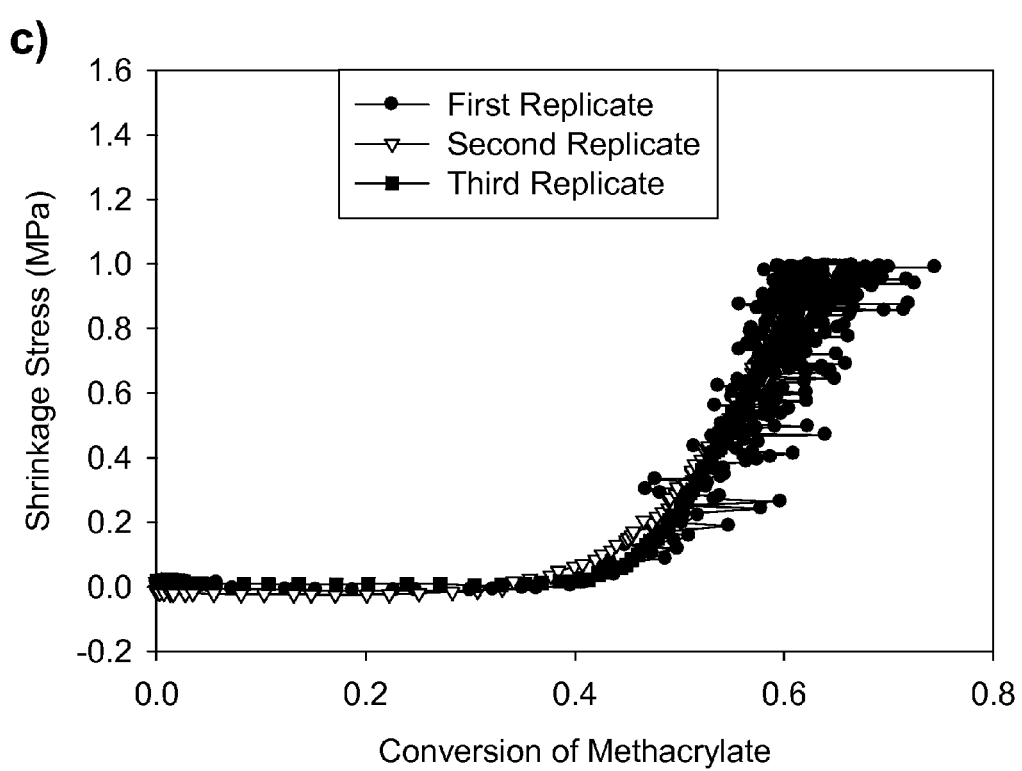
Figure 6D:
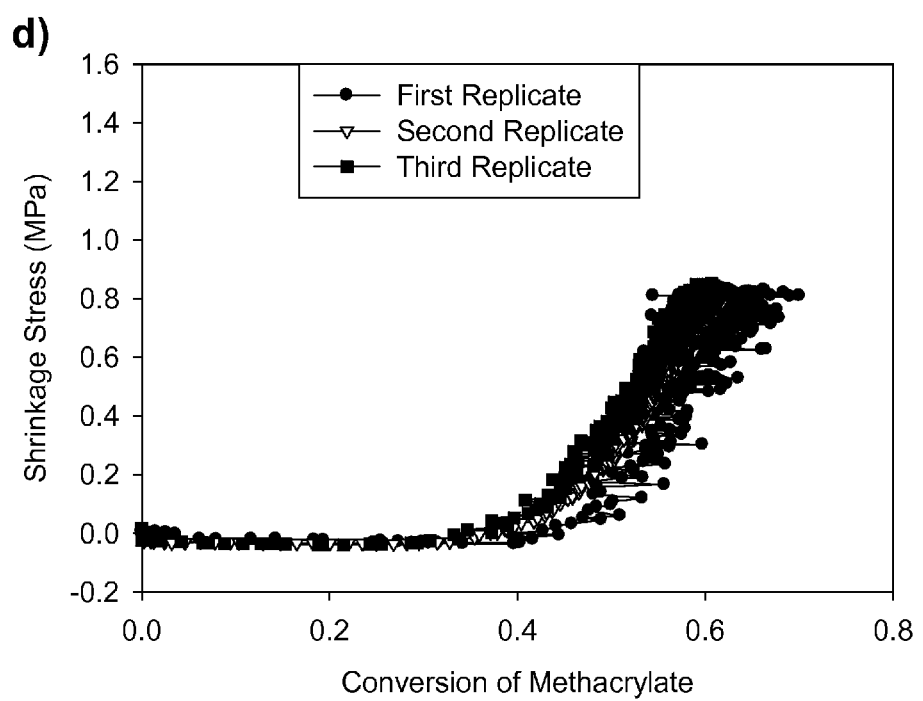
Figure 6E:
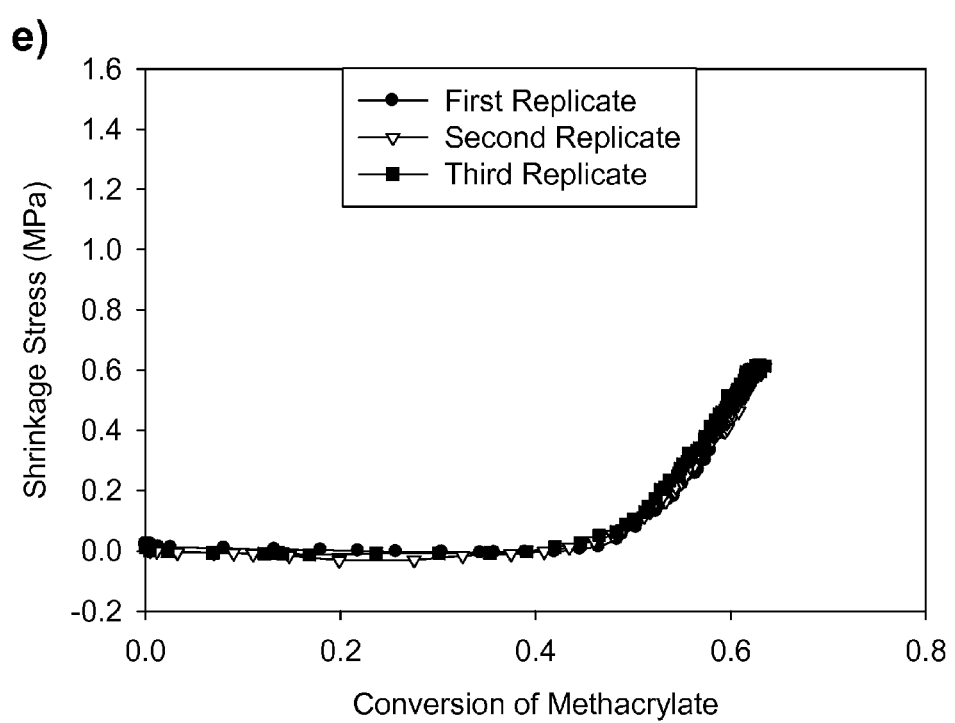
Figure 7A:
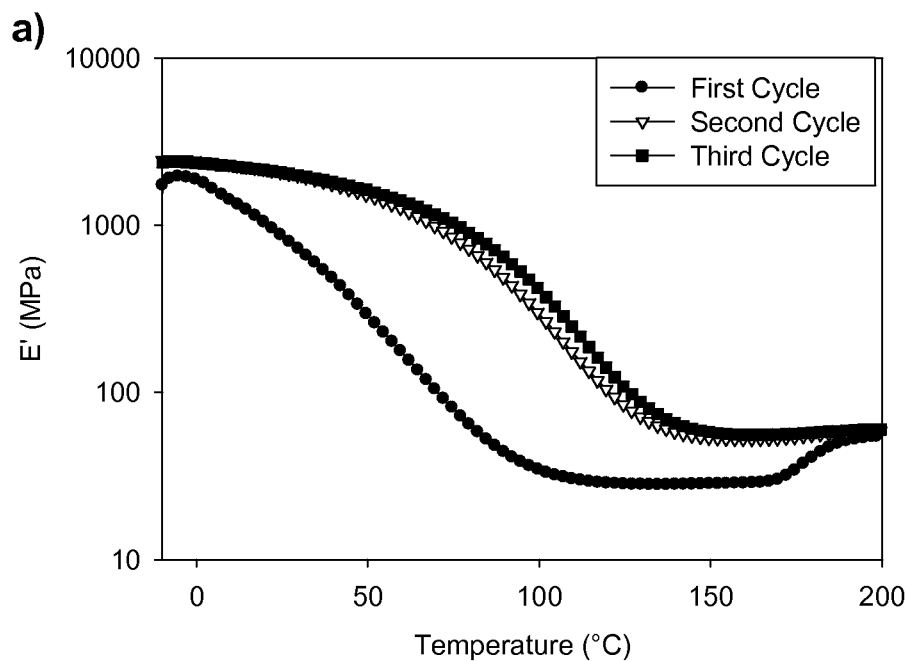
FIG. 7 Elastic modulus versus temperature for triplicate runs of: a) 70:30 BisEMA:TEGDMA. b) 1.5 wt % 1b and 98.4 wt % 70:30 BisEMA:TEGDMA. c) 2 wt % 1b and 97.9 wt % 70:30 BisEMA:TEGDMA. d) 1.5 wt % 1a and 98.4 wt % 70:30 BisEMA:TEGDMA. e) 2 wt % 1a and 97.9 wt % 70:30 BisEMA:TEGDMA. Samples were formulated with 0.1 wt % of Irgacure 184 and irradiated at 365 nm, 1 mW/cm² for 15 min.
Figure 7B:
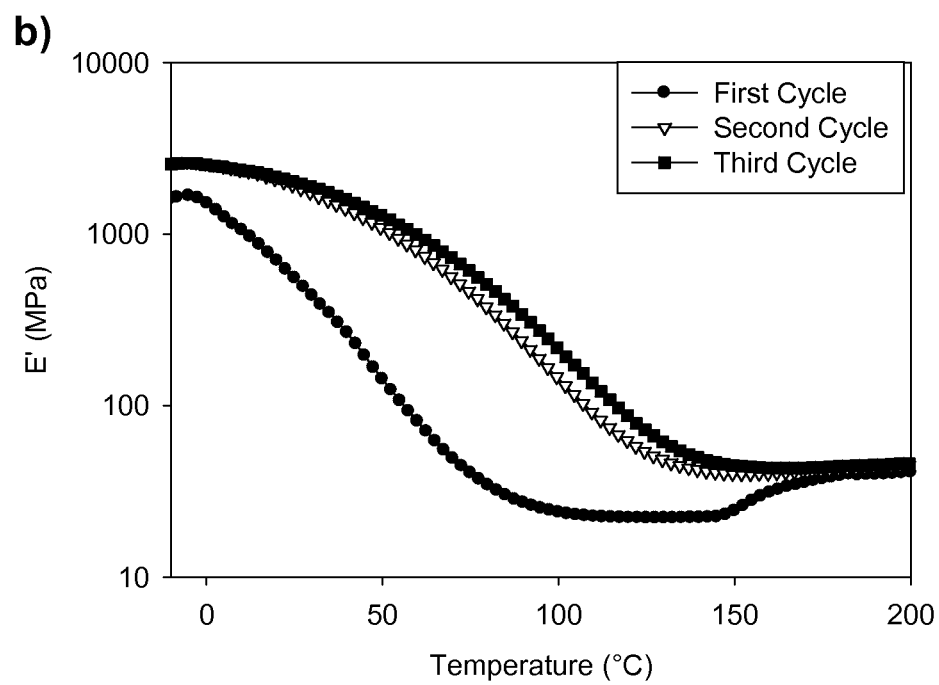
Figure 7C:
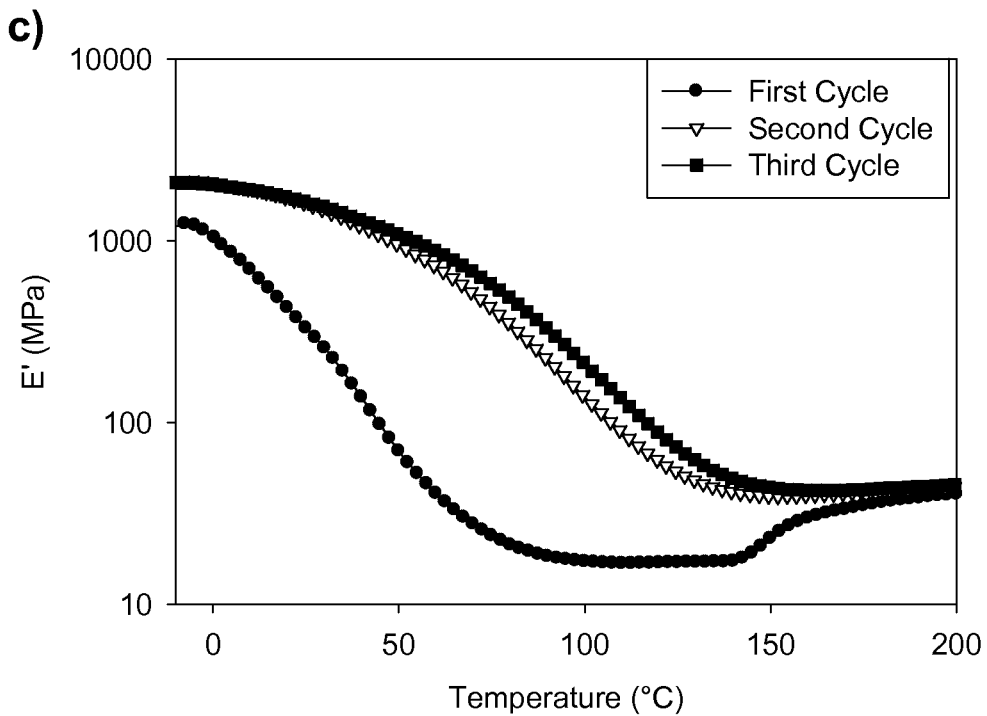
Figure 7D:
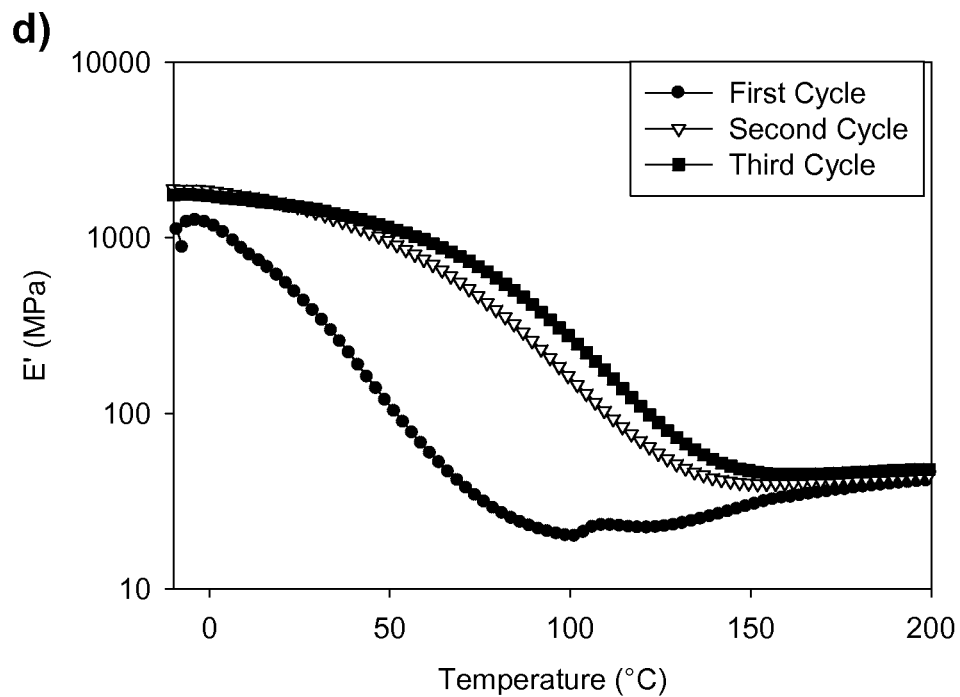
Figure 7E:
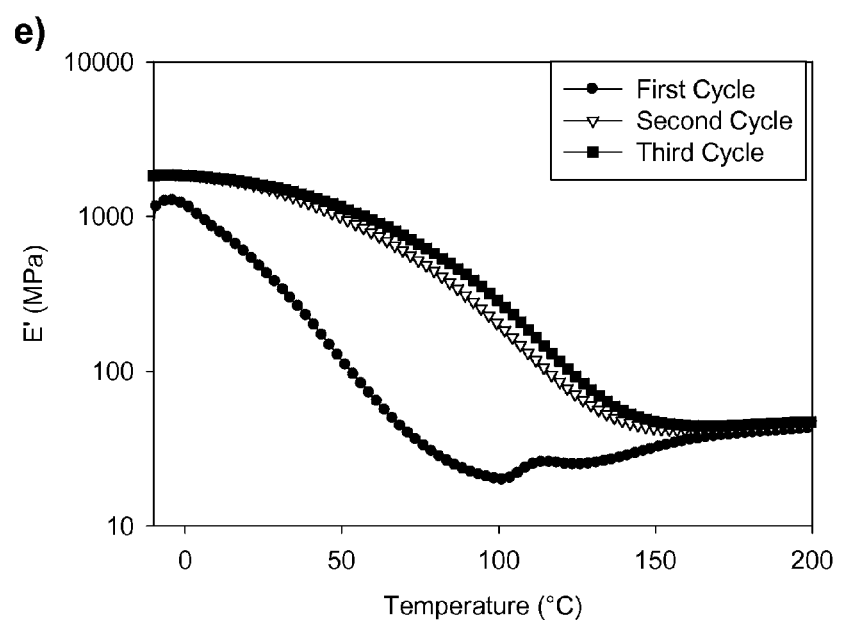
Figure 8A:
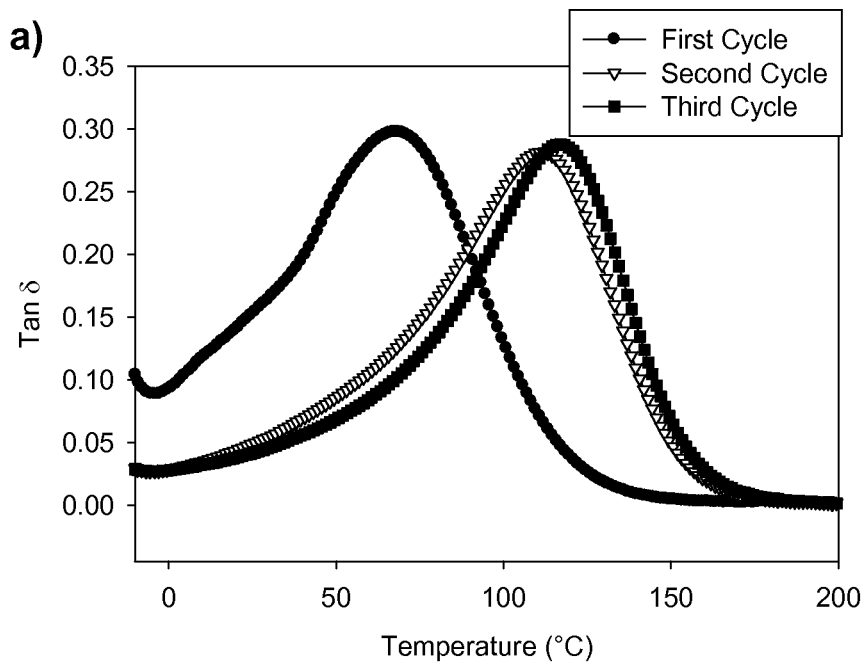
FIG. 8: Tan δ versus temperature for triplicate runs of: a) 70:30 BisEMA:TEGDMA. b) 1.5 wt % 1b and 98.4 wt % 70:30 BisEMA:TEGDMA. c) 2 wt % 1b and 97.9 wt % 70:30 BisEMA:TEGDMA. d) 1.5 wt % 1a and 98.4 wt % 70:30 BisEMA:TEGDMA. e) 2 wt % 1a and 97.9 wt % 70:30 BisEMA:TEGDMA. Samples were formulated with 0.1 wt % of Irgacure 184 and irradiated at 365 nm, 1 mW/cm² for 15 min.
Figure 8B:
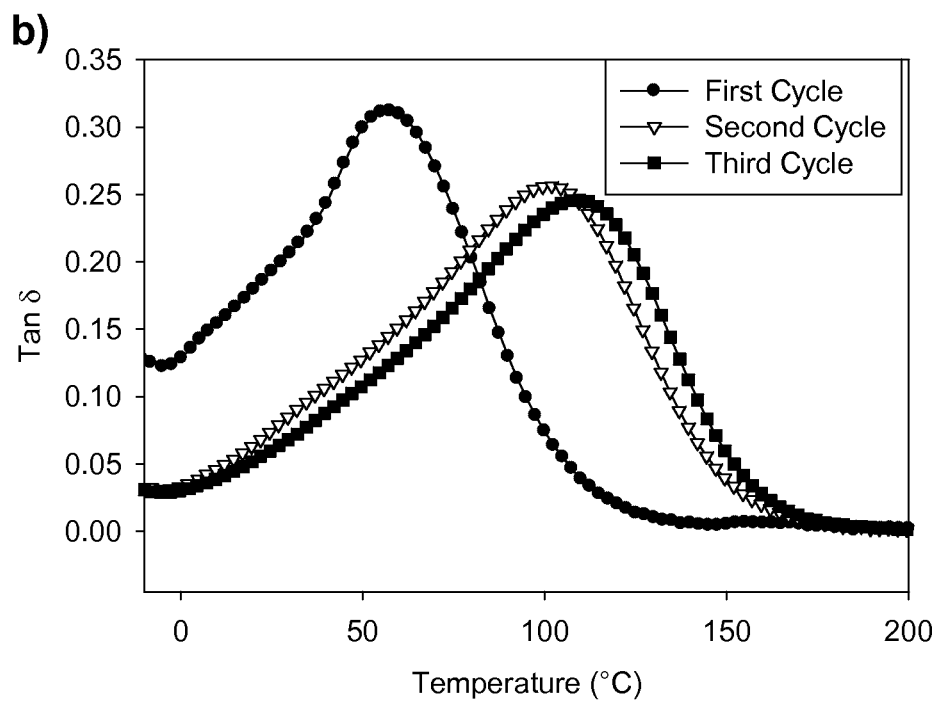
Figure 8C:
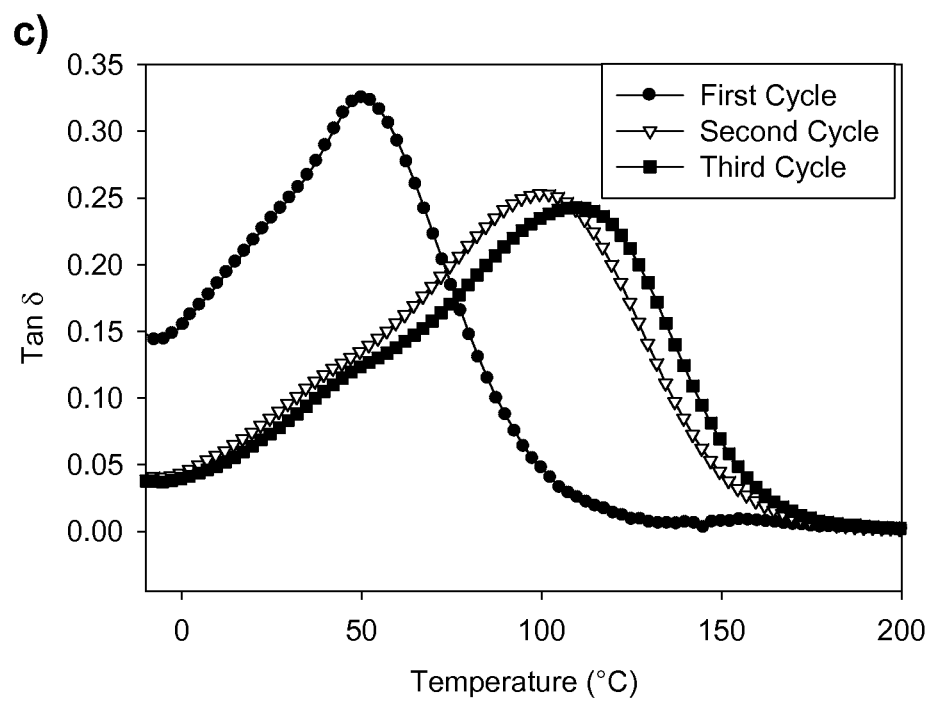
Figure 8D:
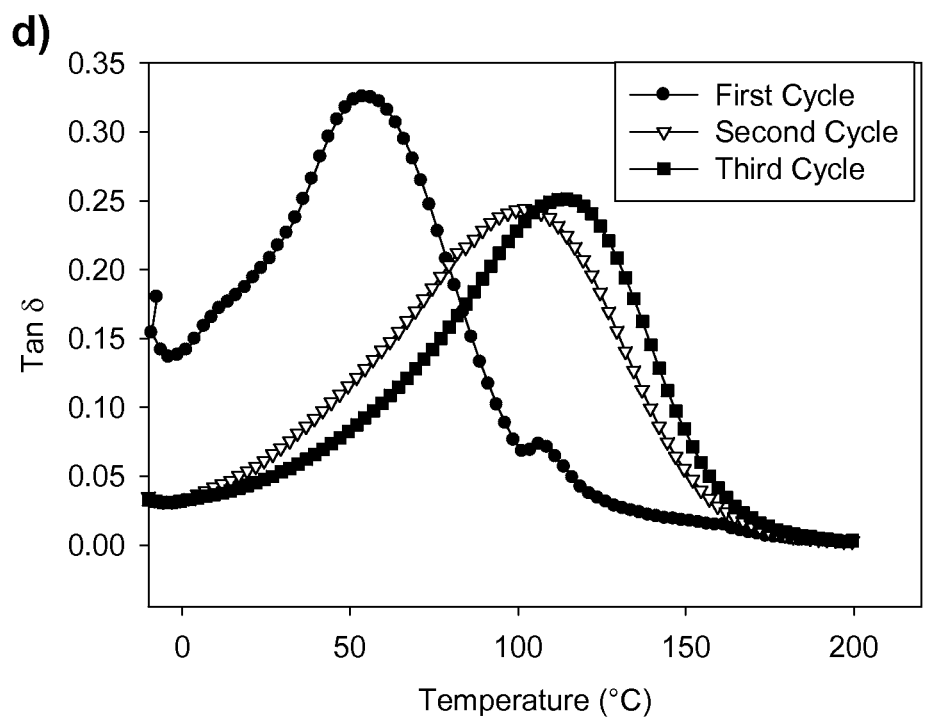
Figure 8E:
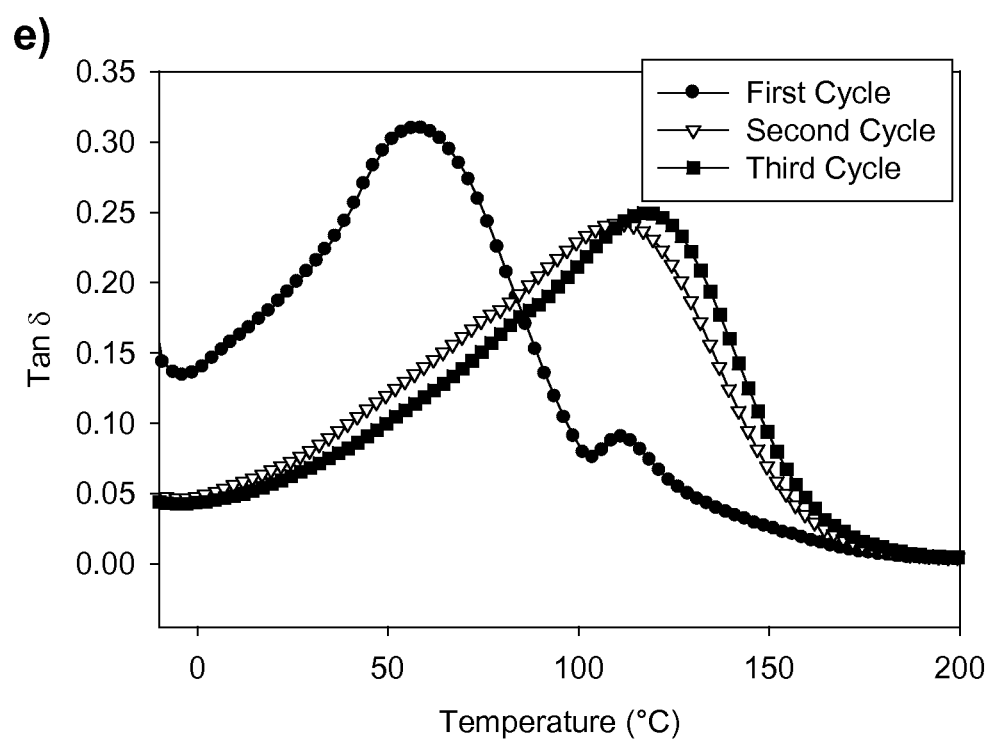

As shown in FIG. 4, samples containing 1a have similar mechanical properties to those containing 1b. As discussed previously in the kinetic and tensometer studies, 1b is not playing a reactive role in the polymerization of the crosslinked network, while 1a is, but both types of samples produced similar mechanical properties, suggesting that compound 1a is not incorporated into the network; rather, it functions as an addition-fragmentation chain transfer agent, and allows for network rearrangement and delayed gelation.

Conclusions

It was demonstrated here that by incorporating a compound (1a) that can undergo free radical rearrangement/addition-fragmentation chain transfer, a delay in gelation and network rearrangement are obtained, with concomitant reduction of shrinkage stress. Real-time FT-IR studies showed a reduction in the polymerization rate for samples containing 1a as compared to the pure dimethacrylate resins (70:30 BisEMA:TEGDMA). Shrinkage stress was reduced significantly, with dimethacrylate samples containing 2 wt % of 1a as compared to the pure dimethacrylate systems (shrinkage stress were 0.61 MPa, 1.32 MPa, respectively). Mechanical properties of samples containing 2 wt % of 1a did not deviate from the pure dimethacrylate system, while achieving the desired reduction in shrinkage stress. This outcome demonstrates that the incorporation of a RAFT agent and the subsequent reactions that are enabled can be used to minimize shrinkage stress, while maintaining the favorable attributes of the polymer system, with no synthetic modifications necessary to the monomer unit. See also Leung and Bowman (Macromolecular Chemistry and Physics, 2012, 213, 198-204) and supporting information available for this publication at <http://onlinelibrary.wiley.com/store/10.1002/macp.201100402/asset/supinfo/macp_2011 00402_sm_suppl.pdf?v=1&s=3055b56f9944f6e2813c9ae1 c762ffb379d8fc40>, hereby incorporated by reference in their entirety for its description of the experiments described in this example.

TABLE S1

Shrinkage stress and percent conversion of methacrylate for tensometer experiments.

| Composition[a] | Replicate | Shrinkage Stress (MPa) | % Conversion of Methacrylate[b] | % Conversion Upon Start of Shrinkage Stress[c] |
|---|---|---|---|---|
| 70:30 BisEMA:TEGDMA | 1st Replicate | 1.25 | 63.6% | 47.5% |
|  | 2nd Replicate | 1.29 | 65.6% | 40.4% |
|  | 3rd Replicate | 1.42 | 67.1% | 44.5% |
| 1.5 wt % of 1b[d] | 1st Replicate | 1.08 | 65.0% | 47.7% |
|  | 2nd Replicate | 0.971 | 68.1% | 46.7% |
|  | 3rd Replicate | 0.896 | 62.8% | 44.4% |
| 2 wt % of 1b[d] | 1st Replicate | 0.990 | 68.6% | 48.0% |
|  | 2nd Replicate | 0.986 | 63.7% | 44.4% |
|  | 3rd Replicate | 0.979 | 63.4% | 46.0% |
| 1.5 wt % of 1a[d] | 1st Replicate | 0.832 | 63.1% | 46.5% |
|  | 2nd Replicate | 0.806 | 61.3% | 43.3% |
|  | 3rd Replicate | 0.835 | 60.4% | 39.2% |
| 2 wt % of 1a[d] | 1st Replicate | 0.595 | 63.2% | 50.2% |
|  | 2nd Replicate | 0.607 | 63.3% | 49.0% |
|  | 3rd Replicate | 0.615 | 63.1% | 47.5% |

[a]Samples were cured with an EXFO Acticure with 365 nm light at 1 mW/cm$^2$ intensity for 15 minutes, with 0.1 wt % of Irgacure 184;
[b]Monitored through FT-IR of peak area centered at 6165 cm$^{-1}$;
[c]Two separate linear regression fits were executed, one for the plateau at the beginning of the polymerization (no shrinkage stress), and a second one on the growing shrinkage stress of the conversion versus shrinkage stress curves. Percent conversion upon start of shrinkage stress was estimated as the point of intersection of these two lines;
[d]Other percent of composition was 70:30 BisEMA:TEGDMA.

REFERENCES

1. C. Decker, *Progress in Polymer Science* 1996, 21, 593-650.
2. C. Decker, *Polymer International* 2002, 51, 1141-1150.
3. J. G. Kloosterboer, *Advances in Polymer Science* 1988, 84, 1-61.
4. J. T. Sheridan, M. R. Gleeson, C. E. Close, J. V. Kelly, *Journal of Nanoscience and Nanotechnology* 2007, 7, 232-242.
5. J. P. Fouassier, X. Allonas, D. Burget, *Progress in Organic Coatings* 2003, 47, 16-36.
6. R. J. M. Zwiers, G. C. M. Dortant, *Applied Optics* 1985, 24, 4483-4488.
7. L. G. Lovell, K. A. Berchtold, J. E. Elliott, H. Lu, C. N. Bowman, *Polymers for Advanced Technologies* 2001, 12, 335-345.
8. H. Lu, J. A. Carioscia, J. W. Stansbury, C. N. Bowman, *Dental Materials* 2005, 21, 1129-1136.
9. J. W. Stansbury, C. N. Bowman, S. M. Newman, *Physics Today* 2008, 61, 82-83.
10. C. Decker, *Polymer International* 1998, 45, 133-141.
11. E. Selli, *Trends in Photochemistry & Photobiology* 1997, 4, 55-65.
12. W. Shi, *Trends in Photochemistry & Photobiology* 2001, 7, 131-145.
13. Y. Uozu, N. Hirota, *Kobunshi Ronbunshu* 2004, 61, 49-62.
14. C. L. Davidson, A. J. Feilzer, *Journal of Dentistry* 1997, 25, 435-440.
15. R. R. Braga, R. Y. Ballester, J. L. Ferracane, *Dental Materials* 2005, 21, 962-970.
16. T. Y. Lee, J. Carioscia, Z. Smith, C. N. Bowman, *Macromolecules* 2007, 40, 1473-1479.
17. L. F. Francis, A. V. McCormick, D. M. Vaessen, J. A. Payne, *Journal of Materials Science* 2002, 37, 4717-4731.
18. H. Lu, J. W. Stansbury, C. N. Bowman, *Dental Materials* 2004, 20, 979-986.
19. D. A. Tilbrook, R. L. Clarke, N. E. Howle, M. Braden, *Biomaterials* 2000, 21, 1743-1753.
20. J. W. Stansbury, *Journal of Dental Research* 1992, 71, 1408-1412.
21. M. H. Chen, *Journal of Dental Research* 2010, 89, 549-560.
22. H. Lu, M. Trujillo-Lemon, J. Ge, W. Stansbury Jeffrey, *Compendium of continuing education in dentistry* (Jamesburg, N.J.: 1995) 2010, 31 Spec No 2, 1-4.
23. T. Inoue, *Progress in Polymer Science* 1995, 20, 119-153.
24. C. B. Bucknall, P. Davies, I. K. Partridge, *Polymer* 1985, 26, 109-112.
25. C. E. Hoyle, C. N. Bowman, *Angewandte Chemie, International Edition* 2010, 49, 1540-1573.
26. T. Y. Lee, Z. Smith, S. K. Reddy, N. B. Cramer, C. N. Bowman, *Macromolecules* 2007, 40, 1466-1472.
27. N. B. Cramer, C. L. Couch, K. M. Schreck, J. E. Boulden, R. Wydra, J. W. Stansbury, C. N. Bowman, *Dental Materials* 2010, 26, 799-806.
28. H. Y. Park, C. J. Kloxin, T. F. Scott, C. N. Bowman, *Macromolecules* (Washington, D.C., United States) 2010, 43, 10188-10190.
29. H. Y. Park, C. J. Kloxin, T. F. Scott, C. N. Bowman, *Dental Materials* 2010, 26, 1010-1016.
30. T. F. Scott, A. D. Schneider, W. D. Cook, C. N. Bowman, *Science* (Washington, D.C., United States) 2005, 308, 1615-1617.
31. C. J. Kloxin, T. F. Scott, C. N. Bowman, *Macromolecules* (Washington, D.C., United States) 2009, 42, 2551-2556.
32. G. Moad, E. Rizzardo, S. H. Thang, *Material Matters* (Milwaukee, Wis., United States) 2010, 5, 2-8.
33. G. Moad, E. Rizzardo, S. H. Thang, *Polymer International* 2011, 60, 9-25.
34. R. Nicolay, J. Kamada, A. Van Wassen, K. Matyjaszewski, *Macromolecules* (Washington, D.C., United States) 2010, 43, 4355-4361.
35. J. T. Lai, D. Filla, R. Shea, *Macromolecules* 2002, 35, 6754-6756.
36. H. Lu, J. W. Stansbury, S. H. Dickens, F. C. Eichmiller, C. N. Bowman, *Journal of Materials Science: Materials in Medicine* 2004, 15, 1097-1103.

We claim:
1. A method for producing a crosslinked polymeric material having reduced internal stress, the method comprising the steps of
 a) forming a mixture by combining a RAFT additive comprising a RAFT functional group with a system consisting essentially of an initiator and at least one monomer having at least two polymerizable functional groups, wherein the molar ratio of RAFT functional groups to polymerizable functional groups in the system is from 0.005 to 0.05, the RAFT additive does not include a polymerizable functional group and the RAFT additive has a molecular weight from 200 to 800 amu; and b) polymerizing the mixture to form a cross-linked polymeric material with at least 50% conversion of the polymerizable functional groups, wherein the mixture is polymerized for 30 minutes or less.

2. The method of claim 1, wherein the mixture is polymerized for 15 minutes or less in step b).

3. The method of claim 1, wherein the initiator is a photoinitiator.

4. The method of claim 1, wherein the monomer in step a) comprises at least two acrylate or methacrylate groups and a bisphenol A-derived group.

5. The method of claim 4, wherein the monomer has a molecular weight from 200 to 800 amu.

6. The method of claim 5, wherein following step b) the glass transition temperature of the cross-linked polymeric material is greater than 20° C.

7. A method for producing a crosslinked polymeric material having reduced internal, the method comprising the steps of
 a) forming a mixture by combining a RAFT additive comprising a RAFT functional group with a system comprising an initiator, a first monomer comprising at least two acrylate or methacrylate groups and a bisphenol A-derived group and a second monomer comprising at least two acrylate or methacrylate groups and at least one ethylene glycol group, wherein the molar ratio of RAFT functional groups to polymerizable functional groups in the system is from 0.005 to 0.05 and the RAFT additive does not include a polymerizable functional group; and
 b) polymerizing the mixture to form a cross-linked polymeric material with at least 50% conversion of the polymerizable functional groups, wherein the mixture is polymerized for 30 minutes or less;
wherein the system includes 50 to 80 wt % of the first monomer comprising at least two acrylate or methacrylate groups and a bisphenol A-derived group and 20 to 50 wt % of the second monomer comprising at least two acrylate or methacrylate groups and at least one ethylene glycol group.

8. The method of claim 7, wherein the first and the second monomer each have a molecular weight from 200 to 800 amu.

9. A method for producing a crosslinked polymeric material having reduced internal stress, the method comprising the steps of
 a) forming a mixture by combining a RAFT additive comprising a RAFT functional group with a system comprising an initiator and a first monomer comprising at least two acrylate or methacrylate groups and 2 to 6 urethane groups, wherein the molar ratio of RAFT functional groups to polymerizable functional groups in the system is from 0.005 to 0.05 and the RAFT additive does not include a polymerizable functional group; and
 b) polymerizing the mixture to form a cross-linked polymeric material with at least 50% conversion of the polymerizable functional groups, wherein the mixture is polymerized for 30 minutes or less;
wherein the system includes 50 to 70 wt % of the first monomer comprising at least two acrylate or methacrylate groups and 2 to 6 urethane groups and 30 to 50 wt % of the second comprising at least two acrylate or methacrylate groups and at least one ethylene glycol group.

10. The method of claim 9, wherein the first and the second monomer each have a molecular weight from 200 to 800 amu.

11. The method of claim 9, wherein the system includes 50 to 60 wt % of the first monomer and 40 to 50 wt % of the second monomer.

12. The method of claim 9, wherein following step b) the glass transition temperature of the cross-linked polymeric material is greater than 20° C.

13. The method of claim 1, wherein the RAFT functional group is a trithiocarbonate group.

14. The method of claim 1, wherein the RAFT additive of step a) is 2,2'-(thiocarbonylbis(sulfanediyl))bis(2-methylpropanoic acid).

15. The method of claim 1, wherein the RAFT functional group is incorporated into midchain during at least a portion of step b).

16. The method of claim 1, wherein the RAFT additive is not incorporated into midchain during step b).

17. A method for producing a crosslinked polymeric material having reduce internal stress, the method comprising the steps of
 a) forming a mixture by combining a RAFT additive comprising a RAFT functional group with a system consisting essentially of an initiator, at least one monomer having at least two polymerizable functional groups and filler particles, wherein the molar ratio of RAFT functional groups to polymerizable functional groups in the system is from 0.005 to 0.05, the RAFT additive does not include a polymerizable functional group, and the RAFT additive has a molecular weight from 200 to 800 amu; and
 b) polymerizing the mixture to form a cross-linked polymeric material with at least 50% conversion of the polymerizable functional groups, wherein the mixture is polymerized for 30 minutes or less.

18. The method of claim 17, wherein the amount of filler particles is from 45 wt % to 85 wt % of the mixture.

19. The method of claim 17, wherein the size of the filler particles is from 0.01 micrometers to 5 micrometers.

20. The method of claim 17, wherein the monomer comprises at least two acrylate or methacrylate groups.

21. The method of claim 17, wherein the RAFT additive is a trithiocarbonate RAFT additive.

22. A method for producing a crosslinked polymeric material having reduced internal stress, the method comprising the steps of
 a) forming a mixture by combining a RAFT additive comprising a RAFT functional group with a system consisting essentially of an initiator, a first monomer having at least two polymerizable functional groups and a second monomer having at least one polymerizable functional group, wherein the molar ratio of RAFT functional groups to polymerizable functional groups in the system is from 0.005 to 0.05, the RAFT additive does not include a polymerizable functional group, and the RAFT additive has a molecular weight from 200 to 800 amu; and
 b) polymerizing the mixture to form a cross-linked polymeric material with at least 50% conversion of the polymerizable functional groups, wherein the mixture is polymerized for 30 minutes or less.

23. The method of claim 22, wherein the first monomer comprises at least two acrylate or methacrylate groups.

24. The method of claim 22, wherein the second monomer comprises an acrylate or methacrylate group.

25. The method of claim 22, wherein the RAFT additive is a trithiocarbonate RAFT additive.

26. A method for producing a crosslinked polymeric material having reduced internal stress, the method comprising the steps of
   a) forming a mixture by combining a RAFT additive comprising a RAFT functional group with a system consisting essentially of an initiator, a first monomer having at least two polymerizable functional groups, a second monomer having at least one polymerizable functional group and filler particles, wherein the molar ratio of RAFT functional groups to polymerizable functional groups in the system is from 0.005 to 0.05, the RAFT additive does not include a polymerizable functional group, and the RAFT additive has a molecular weight from 200 to 800 amu; and
   b) polymerizing the mixture to form a cross-linked polymeric material with at least 50% conversion of the polymerizable functional groups, wherein the mixture is polymerized for 30 minutes or less.

27. The method of claim 26, wherein the amount of filler particles is from 45 wt % to 85 wt % of the mixture.

28. The method of claim 26, wherein the size of the filler particles is from 0.01 micrometers to 5 micrometers.

29. The method of claim 26, wherein the monomer comprises at least two acrylate or methacrylate groups.

30. The method of claim 26, wherein the second monomer comprises an acrylate or methacrylate group.

31. The method of claim 26, wherein the RAFT additive is a trithiocarbonate RAFT additive.

32. A method for producing a crosslinked polymeric material having reduced internal stress, the method comprising the steps of
   a) forming a mixture by combining a RAFT additive comprising a RAFT functional group with a system consisting essentially of an initiator and at least one monomer having at least two polymerizable functional groups, wherein the molar ratio of RAFT functional groups to polymerizable functional groups in the system is from 0.005 to 0.05, the RAFT additive does not include a polymerizable functional group and the RAFT additive is a trithiocarbonate RAFT additive; and
   b) polymerizing the mixture to form a cross-linked polymeric material with at least 50% conversion of the polymerizable functional groups, wherein the mixture is polymerized for 30 minutes or less.

* * * * *

UNITED STATES PATENT AND TRADEMARK OFFICE
CERTIFICATE OF CORRECTION

PATENT NO. : 9,758,597 B2
APPLICATION NO. : 13/567706
DATED : September 12, 2017
INVENTOR(S) : Christopher Bowman et al.

It is certified that error appears in the above-identified patent and that said Letters Patent is hereby corrected as shown below:

In the Claims

At Column 19 Line 22 (Claim 7), replace "having reduced internal, the method" with -- having reduced internal stress, the method --.

Signed and Sealed this
Twenty-seventh Day of February, 2018

Andrei Iancu
*Director of the United States Patent and Trademark Office*